(12) United States Patent
Hogen-Esch et al.

(10) Patent No.: US 10,456,754 B2
(45) Date of Patent: Oct. 29, 2019

(54) HIGH PERFORMANCE MEMBRANES FOR WATER RECLAMATION USING POLYMERIC AND NANOMATERIALS

(71) Applicant: UNIVERSITY OF SOUTHERN CALIFORNIA, Los Angeles, CA (US)

(72) Inventors: Thieo Hogen-Esch, South Pasadena, CA (US); Massoud Pirbazari, Los Angeles, CA (US); Varadarajan Ravindran, Culver City, CA (US); Hayriye Merve Yurdacan, Los Angeles, CA (US); Woonhoe Kim, Los Angeles, CA (US)

(73) Assignee: UNIVERSITY OF SOUTHERN CALIFORNIA, Los Angeles, CA (US)

(*) Notice: Subject to any disclaimer, the term of this patent is extended or adjusted under 35 U.S.C. 154(b) by 478 days.

(21) Appl. No.: 14/821,904

(22) Filed: Aug. 10, 2015

(65) Prior Publication Data

US 2016/0038885 A1  Feb. 11, 2016

Related U.S. Application Data

(60) Provisional application No. 62/034,826, filed on Aug. 8, 2014.

(51) Int. Cl.
*B01D 61/14* (2006.01)
*B01D 65/08* (2006.01)
(Continued)

(52) U.S. Cl.
CPC ......... *B01D 69/148* (2013.01); *B01D 61/14* (2013.01); *B01D 65/08* (2013.01); *B01D 67/0006* (2013.01); *B01D 67/0009* (2013.01); *B01D 67/0079* (2013.01); *B01D 69/12* (2013.01); *B01D 69/125* (2013.01); *B01D 71/56* (2013.01);
(Continued)

(58) Field of Classification Search
CPC ...... B01D 69/148; B01D 69/12; B01D 71/56; B01D 71/76; B01D 71/024; B01D 71/28; B01D 71/34; B01D 71/68; B01D 2323/30; B01D 61/14; B01D 65/08; B01D 67/0006; B01D 67/0009; B01D 67/0079;
(Continued)

(56) References Cited

U.S. PATENT DOCUMENTS 4,277,344 A * 7/1981 Cadotte ............ B01D 69/125
                                                      210/490
6,444,343 B1 * 9/2002 Prakash ............ H01M 8/1009
                                                      429/493
(Continued)

OTHER PUBLICATIONS

Wang, Z., et al., "Novel Go-blended PVDF ultrafiltration membranes", Desalination, 299, pp. 50-54 (2012).*
(Continued)

*Primary Examiner* — Benjamin L Lebron
(74) *Attorney, Agent, or Firm* — Brooks Kushman P.C.

(57) ABSTRACT

A water permeable membrane for water purifications applications including filtration, ultrafiltration, nanofiltration and reverse osmosis is provided. The water permeable membrane includes a porous support and a composite layer disposed over the porous support. Characteristically, the composite layer includes graphene oxide dispersed within a polymer matrix.

30 Claims, 13 Drawing Sheets

(51) Int. Cl.
| | |
|---|---|
| B01D 67/00 | (2006.01) |
| B01D 69/12 | (2006.01) |
| B01D 69/14 | (2006.01) |
| B01D 71/02 | (2006.01) |
| B01D 71/28 | (2006.01) |
| B01D 71/34 | (2006.01) |
| B01D 71/68 | (2006.01) |
| B01D 71/76 | (2006.01) |
| B01D 71/56 | (2006.01) |
| C02F 1/44 | (2006.01) |

(52) U.S. Cl.
CPC .......... *B01D 71/76* (2013.01); *B01D 71/024* (2013.01); *B01D 71/28* (2013.01); *B01D 71/34* (2013.01); *B01D 71/68* (2013.01); *B01D 2323/30* (2013.01); *B01D 2323/40* (2013.01); *B01D 2325/28* (2013.01); *B01D 2325/48* (2013.01); *C02F 1/44* (2013.01); *C02F 2305/08* (2013.01)

(58) Field of Classification Search
CPC .............. B01D 69/125; B01D 2323/40; B01D 2325/28; B01D 2325/48; C02F 1/44; C02F 2305/08
See application file for complete search history.

(56) References Cited

U.S. PATENT DOCUMENTS

| | | | |
|---|---|---|---|
| 8,110,026 | B2 | 2/2012 | Prud'Homme et al. |
| 8,709,213 | B2 | 4/2014 | Compton et al. |
| 2011/0024355 | A1* | 2/2011 | Mansouri ........... B01D 67/0079 210/650 |
| 2012/0241373 | A1* | 9/2012 | Na ........................ B01D 69/12 210/500.38 |
| 2014/0230653 | A1 | 8/2014 | Yu et al. |
| 2016/0303518 | A1* | 10/2016 | Bano ..................... B01D 71/42 |

OTHER PUBLICATIONS

Bottino, A., et al., "Preparation and characterizatin of novel porous PVDF-ZrO2 composite membranes", Desalination, 146, pp. 35-40 (2002).*
Lee, H., et al., "Polyamide thin-film nanofiltration membranes containing TiO2 nanoparticles", Desalination, 219, pp. 48-56 (2008).*
Compton, O., et al., "Graphene oxide, highly reduced graphene oxide, and graphene: versatile building blocks for carbon-based materials", Small, 6, No. 6, pp. 711-723 (2010).*
Lee, J., et al., "Graphene oxide nanoplatelets composite membrane with hydrophilic and antifouling properties for wastewater treatment", Journal of Membrane Science, 448, pp. 223-230 (2013).*
Zuo, J., et al., "In-situ synthesis and cross-linking of polyamide thin film composite (TFC) membranes for bioethanol applications", Journal of Membrane Science, 458, pp. 47-57 (2014). Available online Jan. 25, 2014.*
Sun, X., et al., "Nano-graphene oxide for cellular imaging and drug delivery", Nano Res, 1, pp. 203-212 (2008).*
Rao, A., et al., "Structure-performance correlation of polyamide thin film composite membranes: effect of coating conditions on film formation", Journal of Membrane Science, 211, pp. 13-24 (2003).*
Bano, S., et al., "Graphene oxide modified polyamide nanofiltration membrane with improved flux and antifouling properties", Journal of Materials Chemistry A, 3, pp. 2065-2071 (2015).*
Perreault, F., et al., "Thin-film composite polyamide membranes functionalized with biocidal graphene oxide nanosheets", Environmental Science & Technology Letters. Dec. 6, 2013.*
Chae, H. et al., "Graphene oxide-embedded thin-film composite reverse osmosis membrane with high flux, anti-biofouling, and chlorine resistance," J. of Membrane Science 483 (2015), pp. 128-135.
Kim, H.J. et al., "High-performance reverse osmosis nanocomposite membranes containing the mixture of carbon nanotubes and graphene oxides," J. Mater. Chem. A, (2015), 3, pp. 6798-6809.
Sararpour, M., et al., "Preparation of a Novel Polyvinylidene Fluoride (PVDF) Ultrafiltration Membrane Modified with Reduced Graphene Oxide/Titanium Dioxide (TiO2) Nanocomposite with Enhanced Hydrophilicity and Antifouling Properties," Ind. Eng. Chem. Res., (2014), 53, pp. 13370-13382.
Sararpour, M. et al., "Development of a novel high flux and fouling-resistant thin film composite nanofiltration membrane by embedding reduced graphene oxide/TiO2," Separation and Purification Technology 154 (2015), pp. 96-107.
Yin, J. et al., "Graphene oxide (GO) enhanced polyamide (PA thin-film nanocompsite (TFN) membrane for water purification," Desalination 379 (2016), pp. 93-101.
Zhang, X. et al., "Graphene oxide-based polymeric membranes for broad water pollutant removal;" RSC Adv., (2015), 5, pp. 100651-100662.

* cited by examiner

HIGH PERFORMANCE MEMBRANES FOR WATER RECLAMATION USING POLYMERIC AND NANOMATERIALS

CROSS REFERENCE TO RELATED APPLICATION

This application claims the benefit of U.S. provisional application Ser. No. 62/034,826 filed Aug. 8, 2014, the disclosure of which is incorporated in its entirety by reference herein.

BACKGROUND

Conventional separation processes recover, isolate, and purify products in virtually every manufacturing sphere, covering a broad spectrum of industries including chemicals, pharmaceuticals, petroleum, electronics, automobile, and aerospace. These tend to be energy intensive and expensive, and represent over 40-70 percent of capital and operating costs, and 45 percent of energy costs in the chemical and petroleum industries, even excluding pollution control costs. Recently, industries have gradually shifted their focus from pollution control or treatment towards water recovery, reuse and recycling, primarily due to the following reasons: severe water shortages and droughts, depletion of freshwater resources, stricter environmental regulations, rising treatment costs, and increasing spatial constraints. Membrane technologies offer a more viable and energy-efficient alternative to conventional separations with substantial economic and environmental benefits. Processes such as microfiltration, ultrafiltration, nanofiltration and reverse osmosis have attracted significant attention owing to their wide applications in industrial, commercial, and environmental operations.

Despite recent advancements, membrane technologies must overcome several technological challenges before wide implementation, and these include membrane fouling, permeate flux decline, poor separation (rejection) characteristics, and low durability. These challenges necessitate innovations and developments in producing membranes that manifest greater resistance to fouling, yield increased permeate flux, and exhibit better selectivity.

Semipermeable reverse osmosis (RO) membrane mediated processes are among the most effective methods to achieve the energy-efficient removal of salts (Na and monovalent and divalent ions) and other aqueous contaminants. Thin-film composite polyamide (PA) membranes dominate the current market due to their good salt rejection and wide pH tolerance. However, these membranes tend to have low water permeabilities that arise from their rigid cross-linked structure. Such membranes also suffer from low durability, sensitivity to temperature, lack of resistance to microbial attack (biodegradation) and lack of resistance to different classes of fouling. In addition, due to the high pressures required for sustainable and enhanced water flux, energy requirements are high.

The improvement of RO membranes through incorporation of nano sized objects such as carbon nanotubes and zeolites into the membrane has been carried out, but the results have been marginal (Li L et al., *J. Membr. Sci.*, 2004, 243, 401-404; Li L et al., *Desalination*, 2008, 228, 217-225; Fornasiero F et al., *Proc. Natl Acad. Sci. USA*, 2008, 105, 17250-17255; Holt J K et al., *Science*, 2006, 312, 1034-1037).

Accordingly, there is a need for improved RO membranes structures and methods for making such structures.

SUMMARY

A promising new frontier in membrane technology is the infusion of nano-objects (NOs) into polymeric matrices yielding nanocomposites. This holds promise for achieving significant improvements in aqueous transport and fouling resistance. Important examples include the application of carbon nanotubes (CNTs) mediated micro-transport of water. For instance, the infusion of CNTs can enhance polymer hydrophilicities due to the presence of polar functional groups, thereby significantly reducing their potential for organic, biological, inorganic and particulate fouling. For example, CNTs possess anti-bacterial properties that can greatly reduce biofilm formation and biological fouling. Lastly, their use can lead to stronger membranes, reducing the possibility of mechanical failures (Xie et al., Materials Science and Engineering, 49, 89-112, 2005). In short, infusion of nanomaterials into polymeric materials has the potential for significantly decreasing energy costs as well as operation and maintenance costs of membrane systems. For instance, zeolite nanocrystals (ZNCs) have been shown to improve membrane hydrophilicity and aqueous non-viscous micro-transport properties (Lind et al., Langmuir, 25 (17), 10139-10145, 2009). Therefore, a combination of nanomaterials may provide a synergistic effect in enhancing water transport.

Embodiments described herein are directed at new types of polymeric membranes with nanomaterials for applications in integrated membrane systems such as membrane bioreactor (MBR) processes for water purification, water reclamation, and water reuse, including groundwater recharge and other applications.

Among various technologies, integrated systems such as MBR processes have shown excellent potential for water reclamation, water reuse, groundwater recharge, and similar applications. Superior membranes with better aqueous transport and anti-fouling characteristics can make the technology more efficient and economical. In fact, they can significantly reduce energy costs that constitute a substantial fraction of total operation costs. The continuous flow hybrid MB R system offers several technical advantages over conventional biological processes in environmental applications: small size or footprint requirements for reactor systems, long solids retention times, and efficient retention of particulates, colloids, contaminants and microorganisms. The treated effluent from such hybrid MBR processes must be low in suspended solids, biochemical oxygen demand (BOD), chemical oxygen demand (COD), total organic carbon (TOC) and most pathogens, so as to meet groundwater recharge requirements. The MBR process could be made more compact, efficient and economical with the advent of modern, computerized, and programmable process control systems. The application of an adsorbent such as powder activated carbon (PAC) will defoul the membranes and maintain high permeate fluxes (Pirbazari et al, Water Research, 30 (11), 2691-2706, 1996; Williams and Pirbazari, Water Research, 41 (17), 3880-3893, 2007; Williams et al., Chemical Engineering Science, 84, 494-511, 2012). An added advantage will be the ability of the adsorbent to remove most trace-level or residual micro-pollutants including endocrine disrupting chemicals (EDCs) such as pharmaceutical and personal care products (PPCPs), pesticides and solvents during water reclamation (Snyder et al., Desalination, 202(1-3), 156-181, 2007).

Water reclamation for reuse and groundwater recharge requires that tertiary treatment standards for various components be met, that can be briefly summarized as follows: (i) virus removal or inactivation must exceed 5 logs; (ii) total coliform levels must be below 2.2 coli/100 mL; (iii) turbidity must be below 2 NTU; (iv) total organic carbon concentrations must not exceed 0.5 mg/L (of wastewater origin); (v) organic and inorganic contaminants must meet drinking water maximum contaminant levels (MCLs) (specified by the United States Environmental Protection Agency and/or the State Water Quality Control Board); (vi) lead and copper concentrations must conform to actions levels, and (vii) nitrate limits are based on the treatment technology. It is believed that these standards could be achieved with high efficiency and favorable economics by integrated membranes systems such as the MBR technology using superior ultrafiltration membranes vis-à-vis employing more energy intensive nanofiltration and reverse osmosis membranes.

Nanofiltration is widely used in wastewater treatment and water reclamation applications. Microfiltration and ultrafiltration are often used as a pretreatment to protect the nanofiltration or reverse osmosis membranes from organic and biological fouling. Nonetheless, nanofiltration membranes and reverse osmosis membranes are highly prone to inorganic fouling or inorganic scaling due to deposition of inorganic precipitates including calcium carbonate, magnesium sulfate, and several others. In the context of inorganic fouling or scaling, the membrane must be capable of repulsion of cations such as calcium and magnesium ions as well as anions such as sulfates and carbonates so that the scaling due to precipitation of the membrane is substantially reduced. In some embodiments, the present invention uses membrane polymer and nanomaterial formulations to reduce inorganic scaling by taking advantage of surface charge mechanisms.

An important consideration in the formulation of nanofiltration membranes (or for that matter reverse osmosis membranes) using polymer blends with the infusion or impregnation of nanomaterials is the reduction of all types of inorganic fouling. In wastewater treatment and water reclamation applications, the organic fouling potential and rejection characteristics of nanofiltration membranes used for wastewater treatment are based on the molecular size and weight ranges, charge effects and the hydrophilicity as well as the hydrophobicity of the following organic constituents that constitute dissolved organic carbon (DOC) as discussed extensively by Imai et al (2002). The six main dissolved organic matter constituents are the following: (1) Aquatic humic substances (AHS), (2) Hydrophobic bases (HOB), (3) Hydrophobic neutrals (HON), (4) Hydrophilic acids (HIA), (5) Hydrophilic bases (HIB), and (6) Hydrophilic neutrals (HIN). The HON and HIN are neither acid nor basic but are neutral in character. The following aspects must be carefully considered from the standpoint of organic fouling of membranes, particularly nanofiltration membranes that are best suited to remove them:

The AHS and HIA constitute 55% of dissolved organic carbon (DOC)
The average fractional ranges of HIA is 32-75% of DOC
The average range of AHS IS 2-28% OF DOC
The average range of HIN is 0-12% of DOC
The AHS are negatively charged species
The exo-polymeric substances (EPS) from microorganisms are hydrophobic and cover a molecular range of 380-850 Daltons.

The most widely used polymeric membrane materials in conventional applications are the following: cellulose acetate, nitrocellulose, and cellulose esters (CA, CN, and CE), polytetra-fluoro-ethylene (PTFE), polyvinylidene fluoride (PVDF), polypropylene (PP), polyacrylonitrile (PAN), polyamides, polyimides, polyvinyl chloride (PVC), polysulfone (PS), polyether sulfone (PES) polyether sulfone (PES), polyethylene and polypropylene (PE and PP).

Several studies have been conducted to increase the hydrophilic characteristics of polymers, particularly in the case of PS and PES membranes (Richards et al., 2012). There techniques have been employed in this regard: (1) blending polymers like PS with hydrophilic nanoparticles such as the following oxides, $SiO_2$, $ZnO_2$, and $TiO_2$; (2) grafting the polymer such as PS or PES with more hydrophilic polymers, monomers, or functional groups; and (3) coating the polymer with more hydrophilic polymers. Blending of polymers affords the advantage of producing membranes with excellent separation performance, favorable aqueous transport characteristics, good chemical resistance as well as thermal resistance and pH tolerance, and general adaptability to harsh environments in wastewater treatment and water reclamation situations (Richards et al., 2012).

An important aspect in the membrane development scheme is the consideration of new polymer formulations that we are contemplating upon, for example, variations of the present invention contemplate the application of polyvinylidene difluoride (PVDF) and polystyrene sulfonic acid (PSSA) with and without graphene or graphene oxide. Such polymer and copolymer blends have hydrophobic and hydrophilic functional groups, with the latter on the outer surfaces of the polymer films. The purpose of using these types of specific polymer blends is to attain the favorable micro-structural, mechanical, transportive, and fouling resistant properties of the polymer components. The use of polymer blends such as those of PVDF and polystyrene sulfonic acid (PSSA) increases the mechanical strength, robustness and durability of the fabricated membranes. The variation in blending and composition shall also afford flexibility and tunability of the membrane pore sizes and charge effects to enhance transport properties of water molecules and at the same time reduce fouling potential by promoting repulsion of foulants—organic, inorganic, and microbiological. The reduction in fouling refers to both surface fouling and internal pore fouling of the formulated membranes. The polymer formulation should also enhance the mechanical strength and the overall durability and longevity, chemical tolerance, pH tolerance and cleanability (using various chemical agents), besides micro-structural integrity of the membrane.

In recent years, various nanoparticles have been incorporated in membranes such as those of metals or metal oxides or non-metal oxides including $TiO_2$, $SiO_2$, $Al_2O_3$, $ZnO_2$, $ZrO_2$, Ag and Fe, besides zeolites as well as single and multiwalled carbon nanotubes (CNTs) for various applications including wastewater treatment. These membranes can remediate two types of fouling, namely, organic fouling due to natural organic matter and synthetic organic matter, and biological fouling due to microorganisms and their exudates including exo-polymeric substances (EPS), and these aspects are extensively reviewed by Richards et al (2012). These nanoparticles also contribute to improvements in aqueous transport characteristics. Li et al. (2006) showed that the water flux through the PES-$TiO_2$ membrane was significantly enhanced by the inclusion of the titanium dioxide nanoparticles, but the flux was dependent on the nanoparticle concentrations. They also observed that owing to their high diffusivity, nanoparticles exist only for a short time and are susceptible to rapid agglomeration. These nanoparticles can also control biological fouling due to their bactericidal and biocidal effects, and silver nanoparticles are most commonly used for this purpose (Zodrow et al., 2009; Richards et al, 2012). Maximous et al. (2009, 20010) had investigated polyether membranes containing nanoparticles aluminum and zirconium oxides ($Al_2O_3$ and $ZrO_2$), and observed increased hydrophilic characteristics towards enhanced aqueous transport and fouling resistance than plain polymeric membranes. Bae and Tak (2005) observed that titanium dioxide ($TiO_2$) not only adsorbed on to the membrane surface but to the membrane pores as well, so that their concentrations beyond a certain level caused reduced membrane permeability and increased filtration resistance, a factor that highlighted the importance of nanoparticle concentration in membrane synthesis. Nevertheless, the general observation of these studies was that metal or metal oxide nanoparticles had higher affinity for water molecules than plain polymeric membranes and so their impregnation in polymer matrices had positive contributions towards water flux and fouling control. The use of carbon-based nanomaterials such as CNTs, graphene (G) and graphene oxide (GO) can have a more positive impact on polymeric membrane performances in terms of aqueous transport and fouling control. The use of GO in the impregnation of polymeric matrices will be expected have a larger impact on account of some of its inherent characteristics that are discussed here. The use of nanomaterials such as G or GO in the polymer formulations in various concentrations is to facilitate ant-friction micro-flow water transport, promote biocidal characteristics (regarding resistance to biological fouling and destruction of pathogenic organisms), resistance to organic fouling and inorganic fouling or scaling, and chemical stability, besides irreversible oxidation of or reduction of certain contaminants in water.

Engineered graphene and graphene oxide (G and GO) have demonstrated significant potential for ultrathin, ultrafast, and yet precise separation of gas molecules and aqueous ions (Jiang et al., 2015). Observations of intrinsic anti-microbial material properties further highlight the use of graphene-based carbon materials for water treatment membranes with anti-microbial and fouling resistant properties (Perrault et al., 2013; Jiang et al., 2015). Flat GO membranes (using GO without any polymer matrix) have shown about 4-10 times the water flux observed in commercial nanofiltration membranes (Perrault et al., 2013). Crumpled or particulate GO as used in the present invention is structurally three-dimensional as compared to GO sheets, while remaining intrinsically porous in the polymer matrix. The crumpled GO structures have physical defects in the form of vacancies and holes with high ridges and low valleys, readily forming nanoscale channels and pathways for potential rapid water transport and permeation. The crumpled GO cross-linked with polysulfone, polyamide or any typical polymeric material used in membrane fabrication imparts hydrophilic characteristics owing to the abundance of hydrophilic functional groups exemplified by hydroxyl and carboxyl groups (—OH and —COOH). The assembled GO-polymer membranes have an effective pore-size of less than 10 nm, making it suitable for removing macro-molecular organics, colloidal and biological constituents, and several ions though a combination of mechanism—size, exclusion, depth filtration, and surface charge effects (Jiang et al., 2015). These membranes will be suitable for several applications including water treatment, wastewater treatment, water reclamation and industrial separations. More importantly, the modification of hydrophilic groups such as the sulfonic groups will impart the fine tunability of membrane properties such as pore-size, molecular weight cut-off, hydration capability, aqueous transport rates and fouling resistance.

Reverse osmosis and nanofiltration membranes are currently the primary processes for water applications including desalination and water reclamation. These membranes typically include an active polymer and ultrathin ($\leq 0.2$ μm) but highly high cross-linked layer, which is dense, amorphous and has extremely small interstitial voids ($\leq 0.5$ nm) (Kong et al., New Journal of Chemistry, 34, 2101-2104, 2010; Maruf et al., Journal of Membrane Science, 405-406, 167-175, 2012). Reverse osmosis membranes are typically composed of either cellulose acetate (CA) or aromatic polyamides (PAs). The older CA membranes have been used extensively in desalination. However, CA membranes are limited to relatively narrow pH ranges (4.5-7.9), susceptible to biological fouling, and are readily compacted at high pressures. In comparison, PA membranes are superior and are compatible with high temperatures and a wider pH range. Furthermore they are more stable to biological attack and pressure compaction and tend to have excellent water permeability and high salt rejection due to the very thin but efficiently sieving surface layer. However, the PA membranes are susceptible to degradation from the hypochlorous acid (ClOH) added to municipal water used to prevent biological fouling as well as exposure to high or low pH conditions. The other major limitations are inherent difficulties in making polymers with uniform and controllable pore sizes at the sub-nanometer (<1 nm) level because of the lack of appropriate building blocks and/or methods for controlling pore architecture in this small-size regime. Pore size control is crucial in finding the optimum tradeoff between high water permeability and effective molecular or ionic rejection. Thin-film composite (TFC) reverse osmosis membranes are currently the primary membranes for water desalination. These membranes generally consist of two layers: a dense layer and a porous sub-layer (Matsuura, Synthetic Membranes and Membranes Separation Processes. CRC press, Boca Raton, Fla., 1994). The dense layer is usually an aromatic polyamide (PA) that does the actual desalination. It is fabricated on a porous polysulfone sub-layer which gives it mechanical support and minimizes pressure drop (Fritzmann et al., Desalination, 216 (1), 1-76, 2007). The membranes typically include an active ultrathin ($\leq 0.2$ μm) but high density amorphous polymer layer and have extremely small interstitial voids ($\leq 0.5$ nm). Nanostructured materials including nano-objects such as zeolite nanocrystals (ZNCs) and carbon nanotubes (CNTs) have gained attention since they act as high flux molecular sieving membranes for water desalination (Li et al., Journal of Membrane Science, 243 (1), 401-404, 2004; Li et al., Water Research, 42, 4923-4928, 2008). However, they have some limitations including residual ion permeability around zeolite crystals so that perfect salt rejection cannot be achieved. Similarly, CNT pore diameters are too large to act as molecular sieves for excluding small ions. Graphene also deserves attention due to its unique properties. It consists of a single layer of hexagonally arranged $sp_2$-hybrized carbon atoms; it is inexpensive and has excellent mechanical properties (Holt et al., Science, 312, 1034-1037, 2006; Fornasiero et al., Proceedings of the National Academy of Sciences, 105(45), 17250-17255, 2008; Booth et al., Nano letters, 8(8), 2442-2446, 2008; Li et al., Li et al., Journal of Macromolecular Science, Part A: Pure and Applied Chemistry, 45 (10), 828-832, 2008; Li et al., Journal of Applied Polymer Science, 111 (4), 1942-1946, 2009;

Rajbartoreh et al., Journal of Applied Physics, 109 (1), 014306-014306, 2011). These properties suggest the potential of graphene to create thin high flux membranes. However, graphene is impermeable to molecules as small as helium in its pristine state, and therefore there is need to produce controllable sub-nano pores to facilitate water passage through membrane (Nair et al., Science, 335 (6067), 442-444, 2012).

Recent simulations and experimental studies suggest that sub-nanometer pores can be controllably generated by methods such as oxidation, electron beam irradiation, ion bombardment, or by deposing. Some theoretical studies have been made on water transport and ion rejection of graphene sheets. The transport of ions and water through ~0.5 nm graphene pores and CNTs has been explored using molecular dynamics (MD) simulations. However, graphene is highly hydrophobic and should be expected to result in major membrane fouling (Wang et al., Langmuir, 25(18), 11078-11081, 2009).

On the other hand, graphene oxide (GO), a partially oxidized and hydrophilic form of graphene, has also been studied as active layer and was found to increase water flux (details below). However, GO is partially hydrophilic and can be leached from the membrane over long periods of time (Hu and Mi, ACS Nano, 4(7), 4317-4323, 2013; Perreault et al., Environmental Science and Technology Letters, 1(1), 71-76, 2013). Furthermore, studies have shown that GO has pore diameters on the order of 1 nm which limits its use in reverse osmosis, but is consistent with acting as an effective nano-level filtration layer. It was used in membrane coating for enhancing antifouling properties, but had a limited effect on water flux (Choi et al., ACS Applied Materials and Interfaces, 5(23), 12510-12519, 2013; Perreault et al., 2013).

Although most of the polymeric materials have good mechanical, thermal and chemical properties, many of them are generally more hydrophobic than desirable. Therefore their long-term use in water-based separations is severely limited by their susceptibility to membrane fouling. These membrane surfaces can be made more hydrophilic by several techniques including the following: polymer grafting, polymer blending, ion beam radiation, plasma treatment, free-radical polymerization, chemical oxidation, ultraviolet radiation grafting, grafting with functionalized polymer and chelating agent, and redox graft polymerization. The polysulfone membranes are widely used in biological, pharmaceutical, sterilization and environmental applications due to their mechanical toughness, greater hydrophilic character, chemical inertness (pH and oxidation tolerance), low cost and high durability (Kull et al., Journal of Membrane Science, 246, 203-215, 2005). Membranes based on polymer structure modifications, for instance, by one or more of the above techniques, have the potential to give higher permeate fluxes, lower trans-membrane pressures, and greater fouling resistance. In turn, this would increase the efficiency of long-term applications and therefore their technological and economic value. Polymer formulation and synthesis in conjunction with nanomaterial infusion appears to be a promising technique for membrane improvement.

As indicated above, the concept of having a single polymer performing multiple requirements of water purification membranes as described above is a conceptual challenge as a score of properties are required including: (a) minimal membrane fouling, (b) high permeate flux, (c) good separation (rejection) characteristics, (d) excellent or acceptable mechanical properties, and (e) long durability. It is implausible that these properties can be found in a single polymer. Therefore, chemical modification of the surface or bulk of the membrane is desirable, as demonstrated by several research groups. To date, ultrafiltration, nanofiltration and reverse osmosis membranes have been extensively modified by surface treatment (Zhou et al., Environmental Science and Technology, 43, 3865-3871, 2009). However, comparatively little appears to have been done regarding modification of the membrane itself, i.e. the bulk material. Embodiments disclosed herein are directed to this purpose. The first (A) seeks to modify existing, preferably commercially available, membrane polymers such as polysulfones and especially aromatic polyamides as illustrated in FIG. 3. These modifications may be carried out at the membrane surface or the bulk material. In the second approach (B), a polymer composite is proposed including a polymer substrate and added nano objects (NOs) in these forms: (1) graphene derivatives such as graphene oxide (GO) or (2) zeolite nanocrystals (ZNCs).

In a least one embodiment a water permeable membrane for water purifications applications including filtration, ultrafiltration, nanofiltration and/or reverse osmosis is provided. The water permeable membrane includes a porous support and a composite layer disposed over the porous support. Characteristically, the composite layer includes graphene oxide dispersed within a polymer matrix.

In another embodiment, a water purification system including the water permeable membrane set forth above is provided. The water purification system includes a chamber having a first water holding section for holding impure water and a second water holding section for holding purified water. A water permeable layer is interposed between the first water holding section and the second water holding section. The water purification system further includes a pressure applicator that applies pressure to impure water in the first water holding section such that water permeates through the water permeable membrane into the second water holding section.

DETAILED DESCRIPTION

Figure 1:
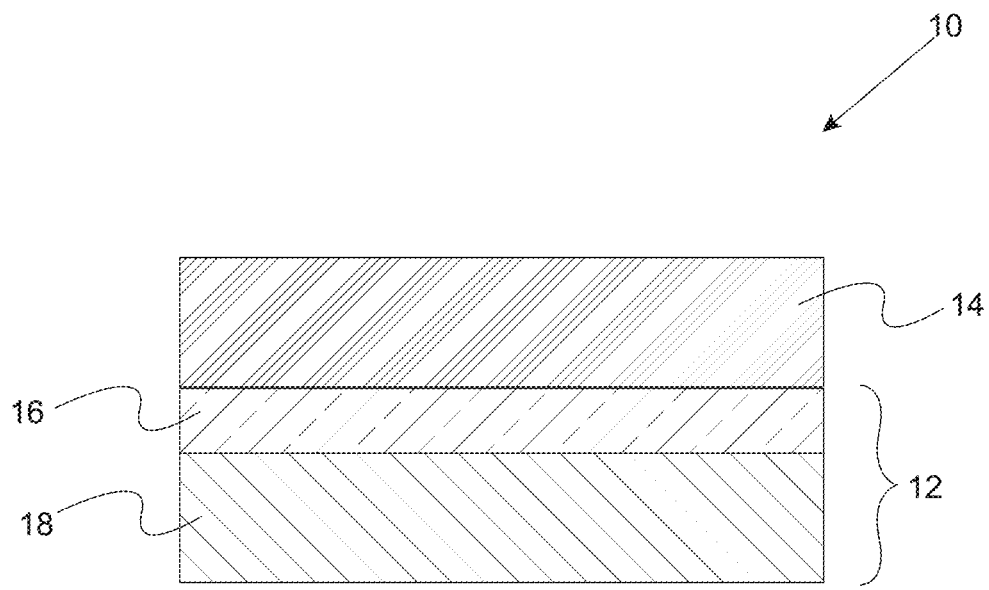
FIG. 1 provides a schematic illustration of a water permeable membrane for water purification systems.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary, percent (%), "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments and is not intended to be limiting in any way.

It must also be noted that the singular form "a", "an", and "the" comprise plural referents unless the context clearly indicates otherwise. For example, reference to a component in the singular is intended to comprise a plurality of components.

Throughout this application, where publications are referenced, the disclosures of these publications are hereby incorporated by reference into this application in their entirety to more fully describe the state of the art to which this invention pertains.

ABBREVIATIONS

"AHS" means aquatic humic substances;
"BOD" means biochemical oxygen demand;
"CA" means cellulose acetate;
"CE" means cellulose esters;
"CN" means nitrocellulose;
"CNT" means carbon nanotube;
"COD" means chemical oxygen demand;
"CSA" means camphor sulfonic acid;
"DI" means distilled water;
"DMF" means N,N-Dimethylformamide;
"DOC" means dissolved organic carbon;
"EDC" means endocrine disrupting chemicals;
"EDS" means X ray dispersion spectroscopy;
"EPS" means exo-polymeric substances;
"G" means graphene;
"GO" means graphene oxide;
"HOB" means hydrophobic bases;
"HON" means hydrophobic neutrals;
"HIA" means hydrophilic acids;
"HIB" means hydrophilic bases;
"MBR" means membrane bioreactor;
"MCL" means maximum contaminant levels;
"MD" means molecular dynamics;
"MPD" means m-phenylene diamine;
"MWCO" means molecular weight cutoff off;
"NO" means nano-object;
"P(BASS-S-CMS)" means poly (tetrabutyl ammonium styrene sulfonate-co-styrene-co-4-chloromethyl styrene);
"PA" means polyamide;
"PAC" means powder activated carbon;
"PAN" means polyacrylonitrile;
"PDA" means phenylene diamine;
"PES" means polyethersulfone;
"PP" means polypropylene;
"PPCP" means personal care product;
"PS" means polysulfone;
"PSSA" means polystyrene sulfonic acid;
"PTFE" means polytetra-fluoro-ethylene;
"PVC" means polyvinyl chloride;
"PVDF" means polyvinylidene fluoride;
"r-GO" means reduced graphene oxide;
"RO" means reverse osmosis;
"SEM" means scanning electron microscopy;
"TEA" means triethanol amine;
"TEM" means transmission electron microscopy;
"TFC" means thin-film composite;
"TMC" means trimesoylchloride;
"TOC" means total organic carbon;
"UF" means ultrafiltration; and
"ZNC" means nanocrystals.

With reference to FIG. 1, a schematic illustration of a water permeable membrane for water purification systems is provided. Water permeable membrane 10 includes porous support 12 and composite layer 14 disposed over the porous support. Composite layer 14 includes graphene oxide dispersed within a polymer matrix. The thickness of composite layer 14 is typically greater than 10 nm. In some variations, the thickness of composite layer 14 is greater than in increasing order of preference, 5 nm, 10 nm, 50, nm, 100 nm, and 50 nm. In other variations, the thickness of composite layer 14 is less than in increasing order of preference, 1 mm, 0.1 mm, 1000, nm, 500 nm, and 200 nm In a refinement, porous support includes a porous polymeric layer 16. In a further refinement, porous support 12 also includes optional fabric layer 18 over which polymeric layer 16 is disposed and typically contacts.

Figure 2:
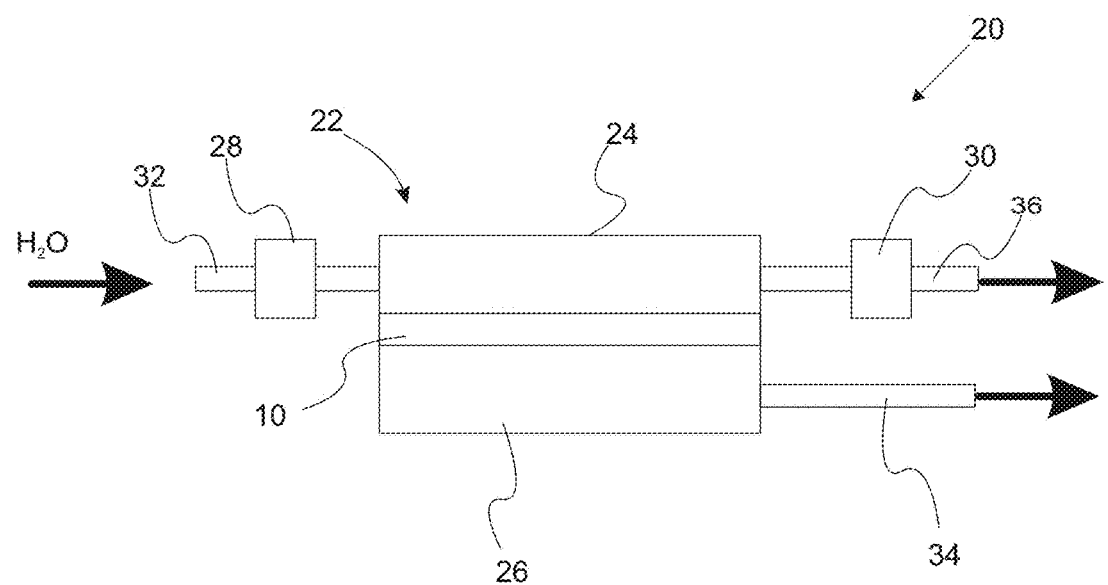
FIG. 2 provides a schematic illustration of a water purification system including the water permeable membrane of FIG. 1.

With reference to FIG. 2, a schematic illustration of a water purification system using the water permeable membrane set forth above is provided. In one variation, the water purification system of this embodiment works by reverse osmosis. Water purification system 20 includes chamber 22 having a first water holding section 24 for holding impure water and a second water holding section 26 for holding purified water. Water permeable membrane 10 is interposed between the first water holding section 24 and the second water holding section 26. In a variation, water purification system 20 further includes a pressure applicator 28 (e.g., a pump) that applies pressure to impure water in the first water holding section 24 such that water permeates through water permeable membrane 10 into the second water holding section 26. Pressure is maintained in first water holding section 24 by pressure regulator 30. During operation, impure water is introduced into water purifications system 20 through inlet 32. The water enters first water holding section 24 under pressure due to the action of pressure applicator 30. In one refinement, first water holding section 24 is operated at a pressure ranging from about 20 to 1500 psi. In another refinement, first water holding section 24 is operated at a pressure from about 30 to 250 psi. In still another refinement, first water holding section 24 is operated at a pressure from about 600 to 1200 psi. The increased pressure in water holding section 24 causes water to move across water permeable membrane 10. The water in water section 10 is more pure than the water initially introduced into the system. The purified water exits through outlet 34 while the water with concentrated impurities exits through outlet 36.

As set forth above, the water permeable membrane of the present invention includes graphene oxide, and in particular graphene oxide nanostructures. Although the exact structure of r-GO is unknown, it appears to include sections of graphene interrupted by "oxidized" areas that are water permeable and which indicate a chemical modification of graphene. It is important to note that the sizes and shapes of the graphene oxide nanostructures are variable. Furthermore, the embodiments are not limited by the thickness of the membrane, which can range from a few nanometers, to one or several microns, or even be on the order of several millimeters.

Graphene oxide includes partially oxidized graphene bearing carboxyl, hydroxyl, and epoxide functional groups that render it water-soluble. In a variation, the graphene oxide is a reduced graphene oxide. Typically, the nano-sized structures of GO will have a largest spatial dimension less than a micron. In other refinements, nano-sized structures may have a largest spatial dimension less than 500 nm, less than 100 nm, or on the order of several nanometers. In still other refinements, the largest spatial dimension may be greater than 3 angstroms, or greater than 5 angstroms. In still another refinement, the graphene oxide has a largest spatial dimension from 10 nn to about 500 nm. Typically, the graphene oxide is present in an amount from about 0.05 weight percent to about 20 weight percent of the total combined weight of the graphene oxide and polymer matrix. In some refinements, the graphene oxide is present in an amount greater than, in increasing order of preference, 0.01 weight percent, 0.05 weight percent, 1.0 weight percent, 2.0 weight percent, or 3 weight percent or the total combined weight of the graphene oxide and polymer matrix. In some refinements, the graphene oxide is present in an amount less than, in increasing order of preference, 50 weight percent, 30 weight percent, 20 weight percent, 10 weight percent, or 5 weight percent or the total combined weight of the graphene oxide and polymer matrix.

As set forth above, the water permeable membrane of the present invention includes a polymer matrix into which the graphene oxide is dispersed. Examples of suitable polymeric matrixes include, but are not limited to, cellulose acetate, nitrocellulose, and cellulose esters (CA, CN, and CE), polytetra-fluoro-ethylene (PTFE), polyvinylidene fluoride (PVDF), polypropylene (PP), polyacrylonitrile (PAN), polyamides, polyimides, polyvinyl chloride (PVC), polysulfone (PS), polyether sulfone (PES) polyether sulfone (PES), polyethylene and polypropylene (PE and PP). Polyamide, and in particular, a cross-linked polyamide matrix is particularly suitable for this purpose. The polyamide may or may not be sulfonated. In a variation, the polyamide is an aromatic polyamide having $C_{6-12}$ aromatic groups. Another useful polymer matrix is a sulfonated or non-sulfonated poly (tetrabutyl ammonium styrene sulfonate-co-styrene-co-4-chloromethyl styrene)-polyvinylidene fluoride blend.

A. Modified Polymers.

Figure 3:
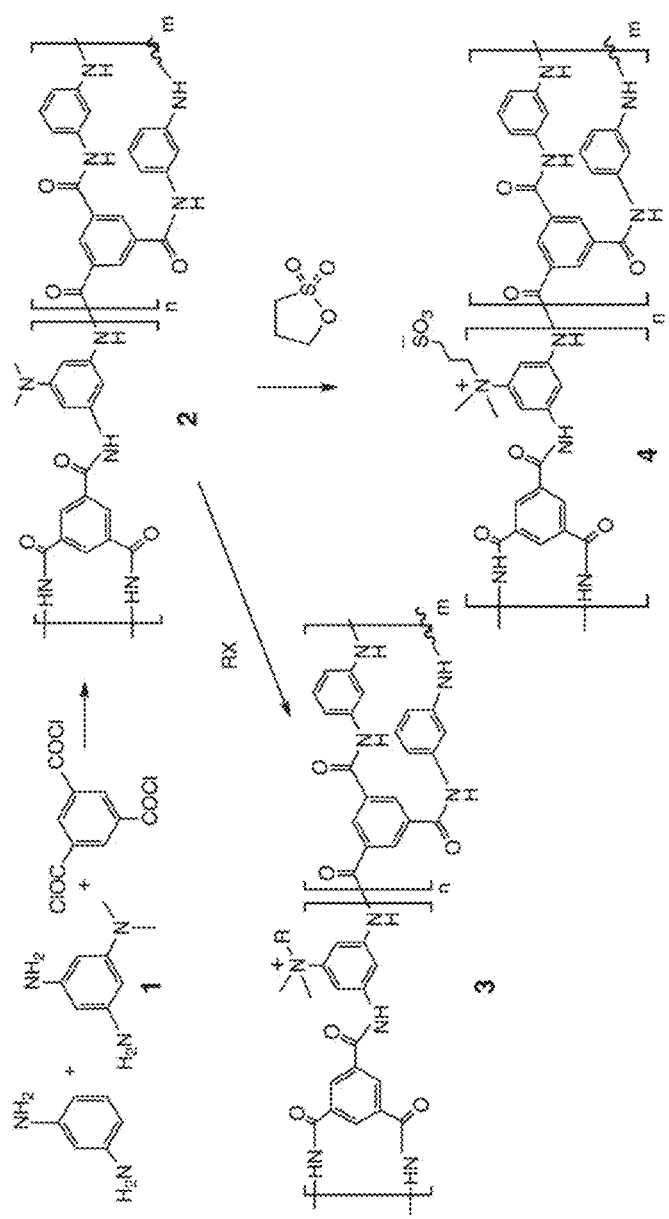
FIG. 3 illustrates the synthesis of polyamide copolymers according to an embodiment.

Materials including polymers having differing molecular weights and molecular weight distributions as well as degrees of branching may be synthesized and characterized by solution and solid state characterization methods. Changes in polymer polarity induced by systematic changes in polymer composition may be carried out by copolymerization and/or chemical-functionalization. The advantages of copolymerization include known and reproducible chemical compositions. Examples of these have been given above, the most promising from the performance perspective being aromatic polyamides. Several pathways seem feasible including the following: (a) chain topology i.e. increases in chain branching by addition of branching units in the diamine. For instance, small variable fractions of 1,3,5-triaminobenzene may be added in order to increase segments densities. (b) A second and promising approach is chemical modification of the polyamide (PA) through chemical modification of the polyamide backbone through changes in the copolymerization of trimesoyl chloride with 2,4-diamino-N,N-dimethylaniline, 1, along with 1,3-phenylenediamine (PDA) (also known as m-phenylenediamine or MPD) as illustrated in FIG. 3. Further modification of chemical structure involves transformation of 1 into copolymers 3 and 4 where 3 has a cationic character while the neutral copolymer 4 is a zwitterionic tertiary ammonium sulfonate copolymer (FIG. 3). The structures shown are that of a copolymer where the molar ratio of the [phenylene diamine]/[1] is two. Higher or lower contents can be easily varied by changing this ratio so that the ionic character and degree of functionalization is controlled. However, it probably should be limited as a large degree of ionic functionalization, while increasing aqueous flow, could decrease salt rejection, organic rejection or filtration selectivity.

B. Polyamide-Nanomaterial Composites.

The addition of nano-objects to the polymer matrices will of course also affect surface and bulk properties and will be subject to considerable control through the membrane synthesis protocols that are designed to be modular. Given the dramatic effects of addition of GO on water flow in the experiments set forth below studies, the synthesis of GO can be carried out from graphene (Suk et al., ACS Nano, 4(11), 6557-6564, 2010; Zhu et al., Advanced Materials, 22 (35), 3906-3924, 2011), and therefore will have better leverage with regard to reproducibility and the effects of oxidation conditions on chemical structure. This will also include further chemical functionalization (see below).

Various embodiments include incorporation of hydrophilic NOs to an aromatic polyamide (PA) matrix (FIG. 4) through interfacial polymerization of MPD and trimesoyl chloride (TMC) precursors with MPD containing varying amounts of NOs. These nanocomposites could be functionalized carbon based nanomaterials such as CNTs and GOs. The low friction flow of water has been proposed to occur through two-dimensional capillaries formed by closely spaced graphene sheets (Nair et al., 2012). Moreover, GO is known to have strong chemical and mechanical stability (Suk et al., 2010). Furthermore, GO is found to have anti-bacterial properties that would decrease microbial attack on membranes (Hu et al., ACS Nano, 4(7), 4317-4323, 2010; Liu et al., ACS Nano, 5(9), 6971-6980, 2011). The GO particles may be added to various phenylene diamines in variable quantities so that the scalability as reverse osmosis/nanofiltration membrane material and the effects on aqueous flow properties can be evaluated. In this way, water flux and anti-fouling properties may be optimized without sacrificing membrane selectivity. This may be performed with all four main types of polymer matrices: (a) neutral PA, (b) PA copolymer modified with varying fractions of quaternary ammonium halides (c) PA functionalized with sulfonated ammonium zwitterions, and (d) partially sulfonated PA anions (FIG. 5).

This chemical modification in copolymers 3 and 4 may be compared with the sulfonic acid copolymer product, 5. In both cases the hydrophilicities of the PAs are increased in a controllable manner.

Functionalization of Graphene Oxide.

Figure 6:
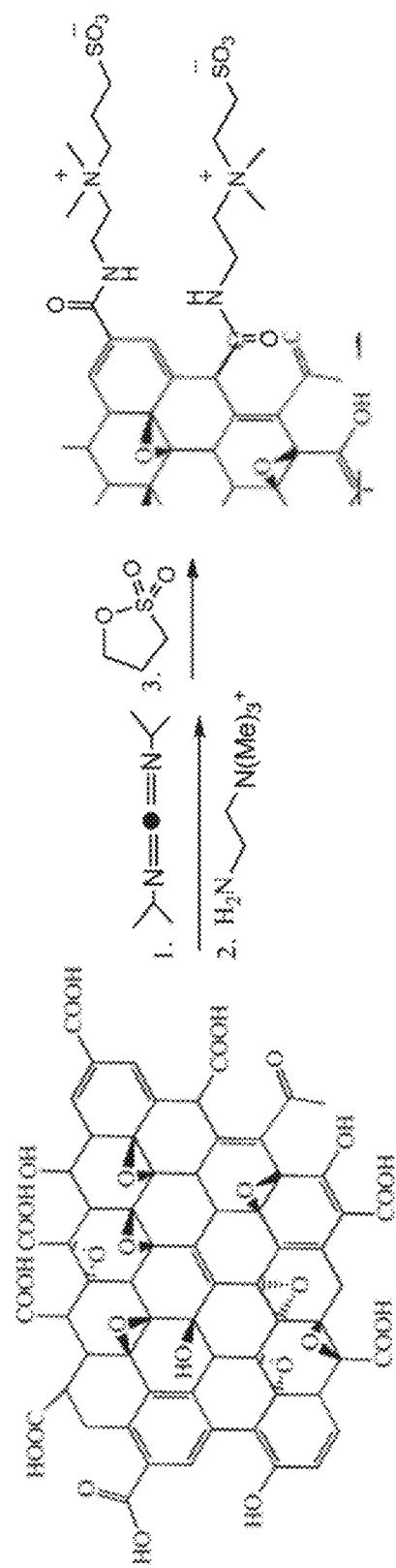
FIG. 6 illustrates the chemical modification of graphene oxide.

An additional surface functionalization with nano-objects (NOs) could also be done to make the surface less prone to biological fouling. This may include a carbodiimide mediated functionalization of carboxylic groups into an amide that carries a tertiary amine (FIG. 6). In turn this will be alkylated to give a tertiary ammonium halide (structures not shown) and the introduction of a zwitterionic ammonium sulfonate through reaction of the amine with a sulfone (FIG. 6). In the former case, a cationic charge is introduced while in the later the ionic group is electrostatically neutral. The impact of these changes will help to further understand the scope and better define the issues that need to be addressed. All of these variations can be followed and evaluated due to efficient intra-campus consultation by members of both research groups.

Membrane Characterization.

Surface characterization includes scanning electron microscopy (SEM), transmission electron microscopy (TEM), X ray dispersion spectroscopy (EDS), atomic force microscopy, and other techniques including atomic force microscopy (AFM), besides surface tension measurements and other techniques. The resulting structural and physicochemical effects on the nature of the surface may be determined by monitoring changes in surface energies for instance by the corresponding surface energies, atomic force microscopy and the changed morphologies of the inner (bulk) membranes to be studied by transmission and surface electron microscopy (SEM and TEM respectively). Materials consisting of polymers having differing molecular weights and molecular weight distributions as well as degrees of branching may be synthesized and characterized by solution and solid-state characterization methods (see below). Changes in membrane hydrophobicity induced by systematical changes in polymer compositions may be carried out by copolymerization or end-functionalization that has potential for considerable structural control. The addition of nano-objects to the polymer matrices will of course also affect surface and bulk properties and will be subject to considerable control through the membrane synthesis processes designed to be modular. In turn, this will affect pore shapes and sizes.

Membrane Fouling Control and Cleaning Strategies.

In the context of membrane synthesis and development, actors influencing membrane fouling in integrated membrane processes are important. These factors include biomass, colloids, natural organics, inorganic precipitates or scalants, and extracellular polymers; and are dependent upon process operating conditions. Membrane fouling in such systems is attributed to the following causes: (i) macromolecular and colloid sorption, (ii) biofilm growth and attachment; and (iii) inorganic precipitation or scaling (Tsai et al., Journal of Environmental Engineering and Science, 3(6), 507-521, 2004; Williams and Pirbazari, Water Research, 41 (17), 3880-3893, 2007; Ravindran et al., Journal of Membrane Science. 344(1-2), 39-54, 2009). Fouling is generally caused by absorption of hydrophobic compounds onto and within membrane pores, and deposition of cake or gel layer on the membrane surface. Biological fouling is predominantly caused by extracellular polymeric substances (EPS) that mainly consist of carbohydrates, proteins, humic substances and nucleic acids, constituting the infra-structure for bacterial floc and biofilm formation (Williams and Pirbazari, 2007; Ravindran et al., 2009). Permeate flux decline due to concentration polarization and membrane fouling can be mitigated by employing powder activated carbon (PAC) adsorbent and fluid management (Williams and Pirbazari, 2007; Ravindran et al., 2009; Williams et al., Chemical Engineering Science, 84, 494-511, 2012). The PAC depolarizes dissolved biological and organic matter and re-entrains colloids and suspended solids from the viscous sub-layer. It adsorbs most organic and bio-organic foulants in wastewaters and reclaimed waters, including humic substances, proteins, carbohydrates and fats (Kilduff and Weber, Environmental Science and Technology, 26 (3), 569-577, 1992). PAC also reduces the thicknesses of mass-transfer and hydrodynamic boundary layers, lowers concentration polarization, and controls gel deposition on membrane surfaces or pores (Pirbazari et al., Water Research, 30 (11), 2691-2706, 1996; Tsai et al., Journal of Environmental Engineering and Science, 3(6), 507-521, 2004; Ravindran et al., 2009).

Membrane fouling can be strategically controlled by concentration polarization suppression, optimization of physical and chemical cleaning protocols, and pre-treatment of feed (Tu et al., Journal of Membrane Science, 265 (1-2), 29-50, 2005; Williams and Pirbazari, 2007). Membrane cleaning strategies are important for fouling control, flux recovery, and rejection maintenance. The efficiencies of various cleaning agents such as alkalies, acids, surfactants, redox chemicals, and enzymes may be evaluated for removing hydrophobic compounds and substances that are major contributors to organic, bio-organic and in organic fouling. The chemical tolerance of the membranes to these cleaning agents may also be determined.

Embodiments described herein provide for the synthesis of novel RO membranes having enhanced water flux and improved resistance to organic, biological, inorganic fouling and scaling as well as other degradation processes.

Graphene oxide (GO), a nano sized material synthesized by the controlled oxidation of graphite, is an inexpensive and commercially available material. Typically, nano sized structures such as GO will have size ranges of less than a micron. In other refinements, nano sized structures may have size ranges of less than 500 nm, less than 100 nm, or on the order of several nanometers. In still other refinements, the size ranges may be greater than 3 angstroms, or greater than 5 angstroms. GO includes partially oxidized graphene bearing carboxyl, hydroxyl, and epoxide functional groups that render it water-soluble. GO is also soluble in several organic solvents and is known to have a strong chemical and mechanical stability (Suk et al., *ACS Nano*, 2010, 4(11), 6557-6564; Dmitriy et al., *Nature*, 2007, 448, 457-460). GO also has antibacterial properties (Liu et al., *ACS Nano*, 2011, 5(9), 6971-6980; Hu et al., *ACS Nano*, 2010, 4(7), 4317-4323). GO, when used as an active layer or when mixed within a polysulfone (PS) membrane, has been shown to be only suitable as a nanofiltration and microfiltration membrane due to lack of blocking monovalent ions (Hu et al., *Environ. Sci. Technol.*, 2013, 47(8), 3715-3723; Ganesh et al., *Desalination*, 2013, 313, 199-207), likely since graphene sheets are separated by approximately 1 nm (Nair et al., *Science*, 2012, 335, 6067, 442-444).

Embodiments disclosed herein incorporate GO into aromatic PA matrices through interfacial polymerization of phenylene diamine (PDA) and trimesoyl chloride (TMC), the first of which contains varying amounts of GO's. PA membranes are known to have high salt rejection and can be used also as ultrafiltration (UF) membranes. Accordingly, the incorporation of GO into PA may promote UF and desalination processes. This involves the deposition of the GO's on the PA surface during the later stages of polymerization or into the bulk by the dissolution of GO's into the PDA solution during polymerization.

Initial work included the development of polymer synthesis protocols with appropriate reaction schemes, free-radical processes, syntheses conditions such as reaction times, curing procedures, and quantitatively controlled incorporation of graphene oxide (GO) into the polymers. Superior membranes were manufactured by adjusting these conditions. The membranes used in the series of preliminary tests were prepared by interfacial polymerization by sequential addition of MPD and TMC on a commercial polyether sulfone (PES) ultrafiltration membrane base with a nominal pore size of 0.08 micron and molecular weight cutoff off (MWCO) of 10,000 Daltons. This is one of the best commercially available ultrafiltration membranes for water reclamation and related applications. The monomers used in the preparation of polyamide membrane were m-phenylene diamine (MPD) and 1,3,5-benzene tricarbonyl chloride or trimesoyl chloride (TMC). Another set of membranes were cast using these monomers MPD and TMC, but with the addition of camphor sulfonic acid (CSA) and triethanol amine (TEA) to make the membranes material more solvophilic in nature, and to observe their hydrophilicity, aqueous transport and rejection characteristics.

The membranes designated as #1 and #2 were all synthesized by interfacial polymerization (for ~1 minute) using MPD and TMC, and cured at room temperature of 60° C. for 10 minutes, except for the presence of GO for membrane #2. Membrane #3 was synthesized by a similar procedure using MPD and TMC followed by CSA and TEA. Membranes designated as #1* and #2* were replicates of membranes #1 and #2, and were tested with 40 mg/L of powder activated carbon (PAC) added to the feed. The purpose of these tests was to assess the performances of the membranes (#1 and #2) in the presence of PAC with regard to permeate flux and TOC rejection.

The results presented in Table 1 summarize the membrane performances based on permeate flux and TOC rejection. Membranes #2 and #2* showed significantly improved water flux (100% and 300% at 2 and 3 hours, respectively), exhibiting superior characteristics in comparison with the best commercially available membrane (UF control) of this type used as a bench-mark standard. Membranes synthesized with GO as the only surface layer are prone to long term leaching of GO. The use of PAC in the feed also showed that the presence of GO in the polymer matrix yielded better permeate flux and TOC rejection (Table 1, membranes #1* and 2*) with TOC rejections as high as 55.9%.

The results of Table 1 can be summarized as follows: The presence of GO in the polymer matrix improved not only the steady-state permeate flux (membranes #1 and #2) but also did not compromise TOC rejection (slightly higher TOC rejection of 32.6% versus 30.9%). Qualitatively similar results were observed when PAC was added to the feed to probe the role of GO, if any, regarding membrane fouling. Thus, the permeate fluxes and TOC rejections (after steady state was reached after 3 hours) were higher for membrane #2* as compared to #1* (presence of GO, see Table 1). The use of CSA and TEA during the polymerization (membrane #3) yielded a flux of 37 L/m$^2$/h at 2 and 3 hours, but gave lower TOC rejection of 18.6%. It is of clear interest to observe the GO content on aqueous transport and organic rejection as part of optimizing membrane performance. Further embodiments may include optimizing the polyamide membranes using GO and other graphene derivatives as well as ZNCs at various proportions.

Figure 10:
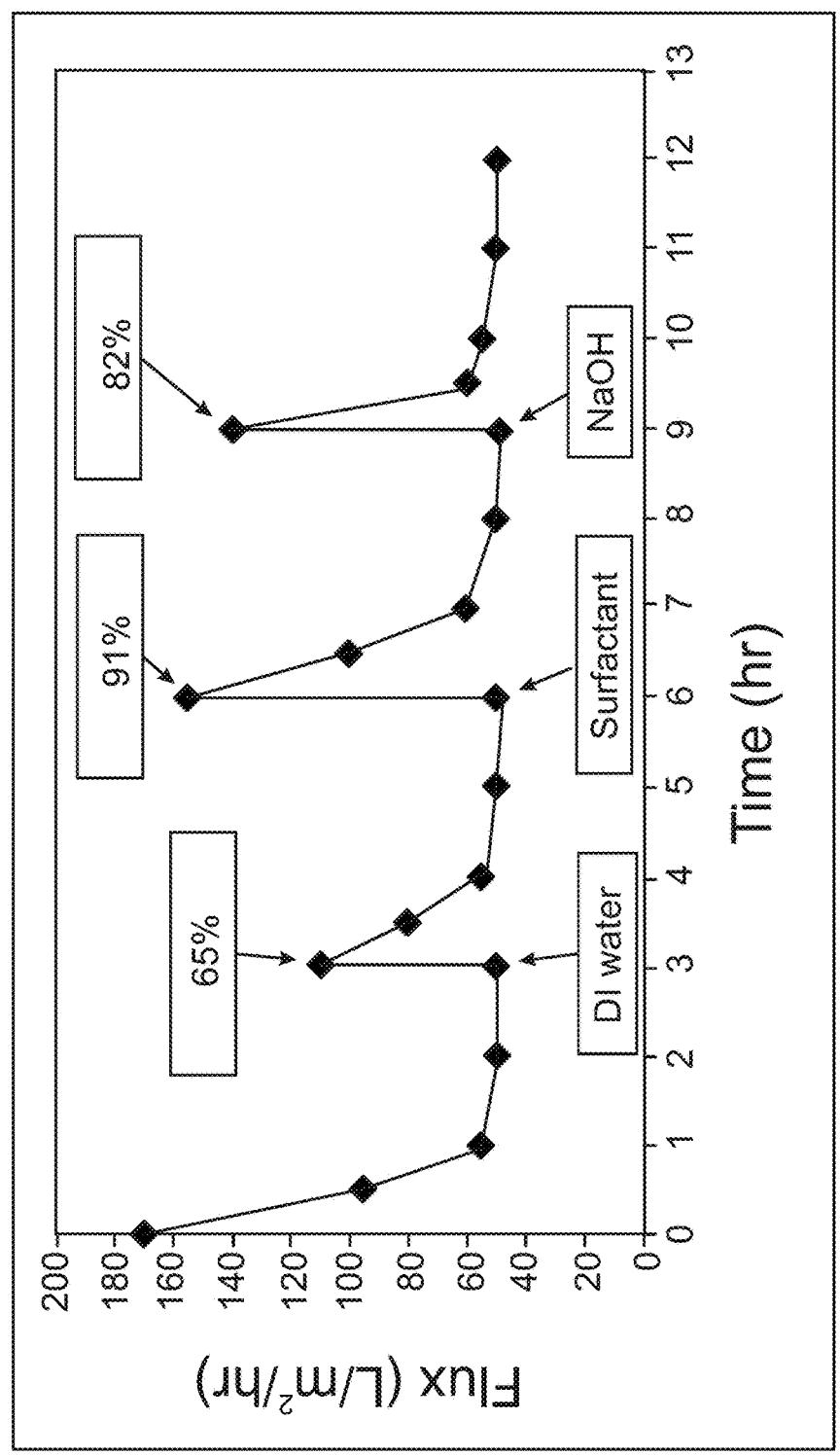
FIG. 10 is a graph of permeate flux after membrane cleaning using deionized distilled (DI) water, surfactant Triton X-100 at 5 mg/L (surfactant A), and dilute sodium hydroxide (1 mM), where the cleaning run is for 1 hour.
Figure 11:
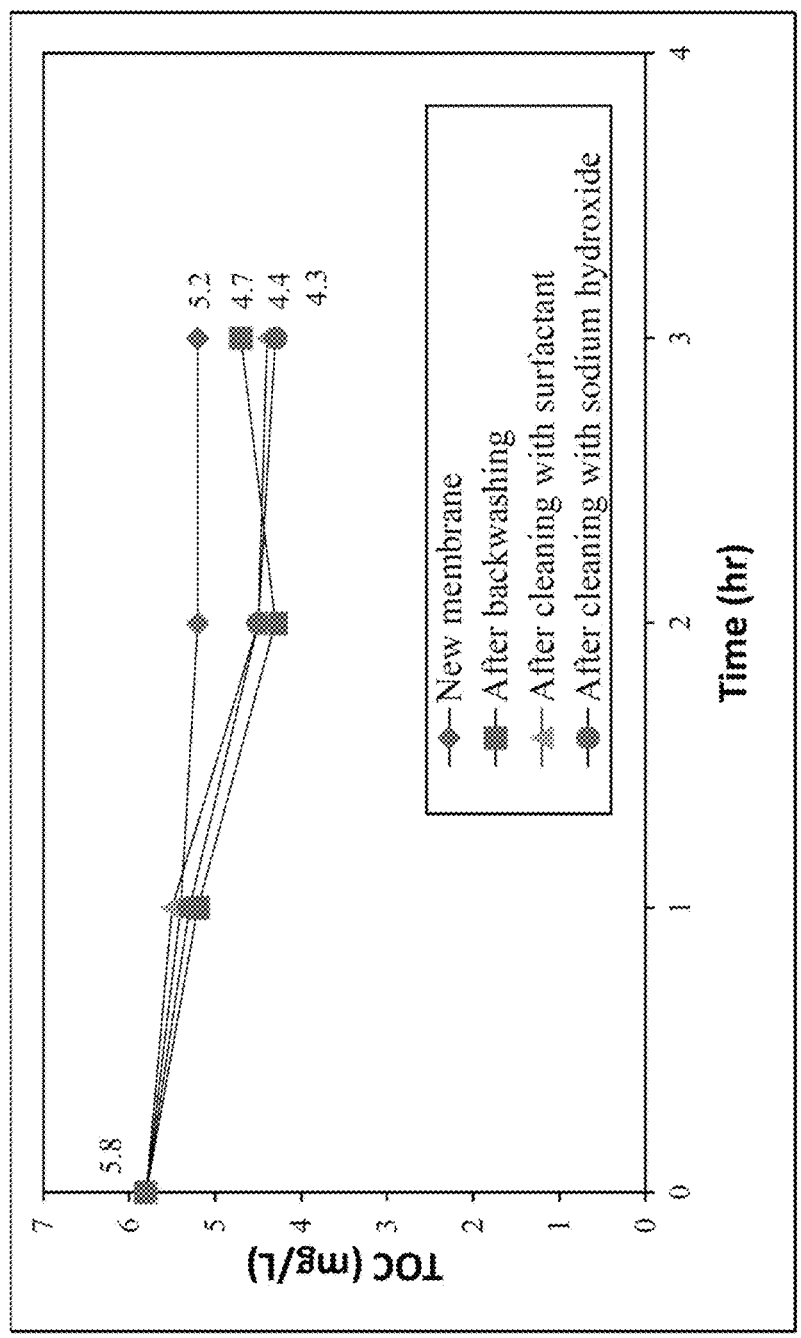
FIG. 11 is a graph of TOC after membrane cleaning using deionized distilled (DI) water, surfactant Triton X-100 at 5 mg/L (surfactant A), and dilute sodium hydroxide (1 mM), where the cleaning run is for 1 hour.

FIGS. 10 and 11 are graphs of permeate flux and TOC, respectively, after membrane cleaning using deionized distilled (DI) water, surfactant Triton X-100 at 5 mg/L (surfactant A), and dilute sodium hydroxide (1 mM), where the cleaning run is for 1 hour. The results show that Trition X-100 surfactant yielded a permeate flux recovery of 91%, much higher than the 82% flux recovery observed after caustic cleaning using sodium hydroxide. The use of DI water yielded a low flux recovery of 61%. The TOC after surfactant cleaning was as low as that observed after caustic cleaning. The higher rejection after cleaning reflects the favorable change in membrane surface properties to separate out more natural organic matter (as TOC).

TABLE 1

Performance comparison of various membranes

| | Membrane | | | | | |
|---|---|---|---|---|---|---|
| Time (h) | #1 | #2+ | #1* | #2*+ | #3++ | UF control |
| | Permeate flux (L/m$^2$/h) | | | | | |
| 0 | 265 | 275 | 200 | 210 | 137.5 | 100 |
| 0.5 | 150 | 140 | 125 | 155 | 125 | 70 |
| 1 | 50 | 50 | 75 | 90 | 69 | 40 |
| 2 | 18 | 40 | 45 | 65 | 37 | 40 |
| 3 | 10 | 40 | 45 | 65 | 37 | 30 |
| TOC rejection (%) | 30.9 | 32.6 | 44.4 | 55.9 | 18.6 | 3.6 |

Figure 4:
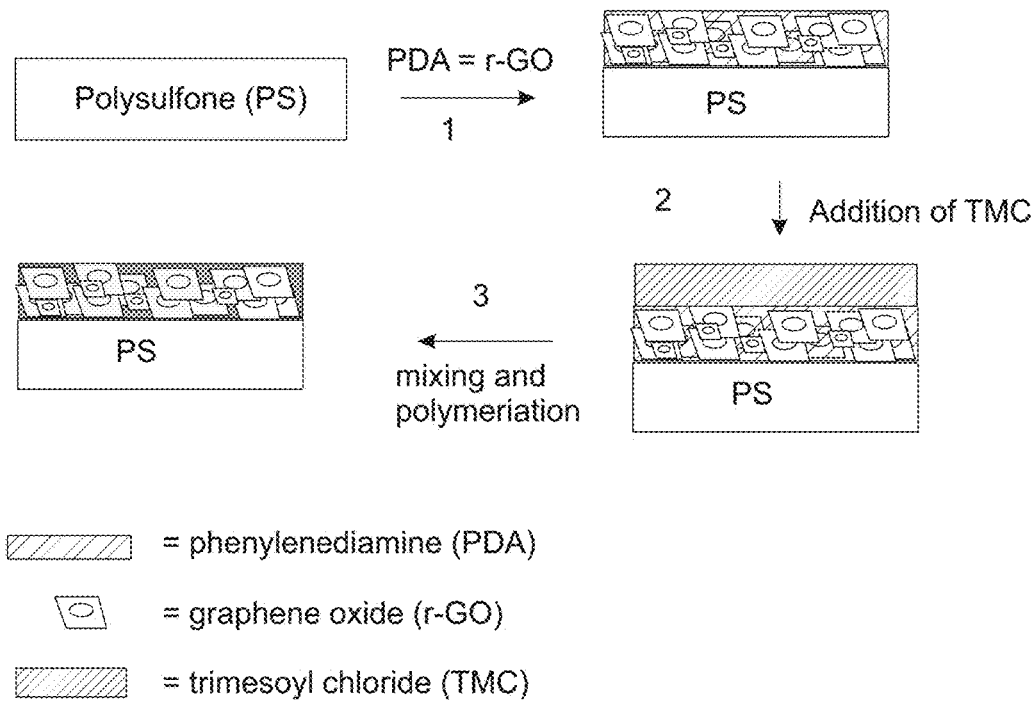
FIG. 4 illustrates the synthesis of GO-modified polyamides according to an embodiment.
Figure 4:
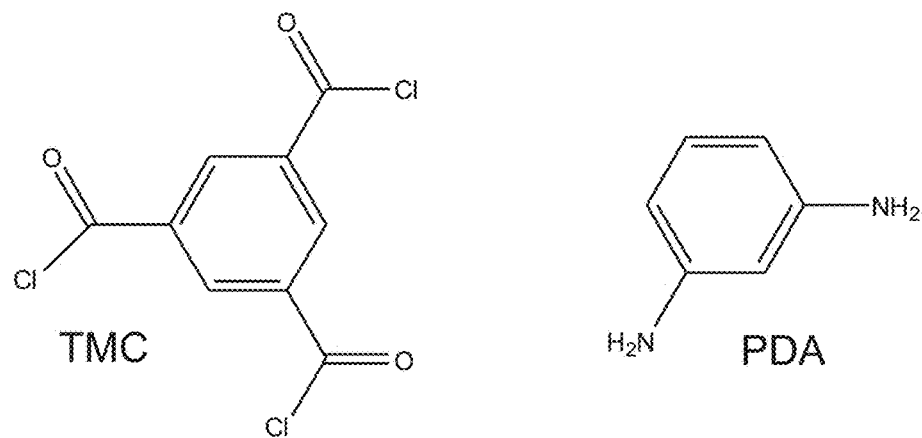
Figure 5:
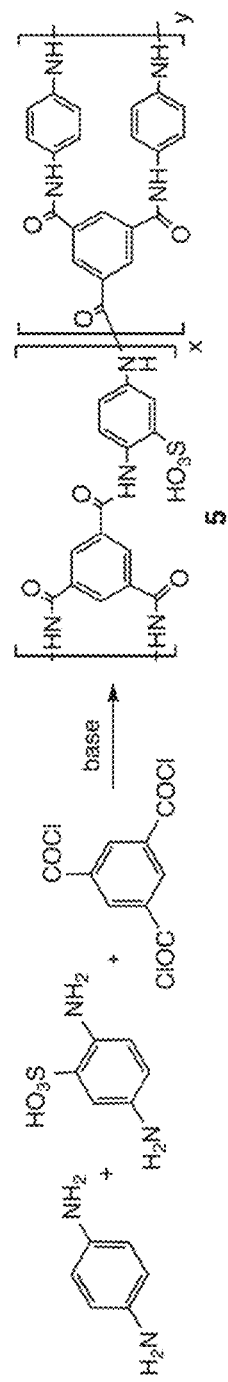
FIG. 5 illustrates an example of partially sulfonated polyamides for membrane applications.
Figure 7:
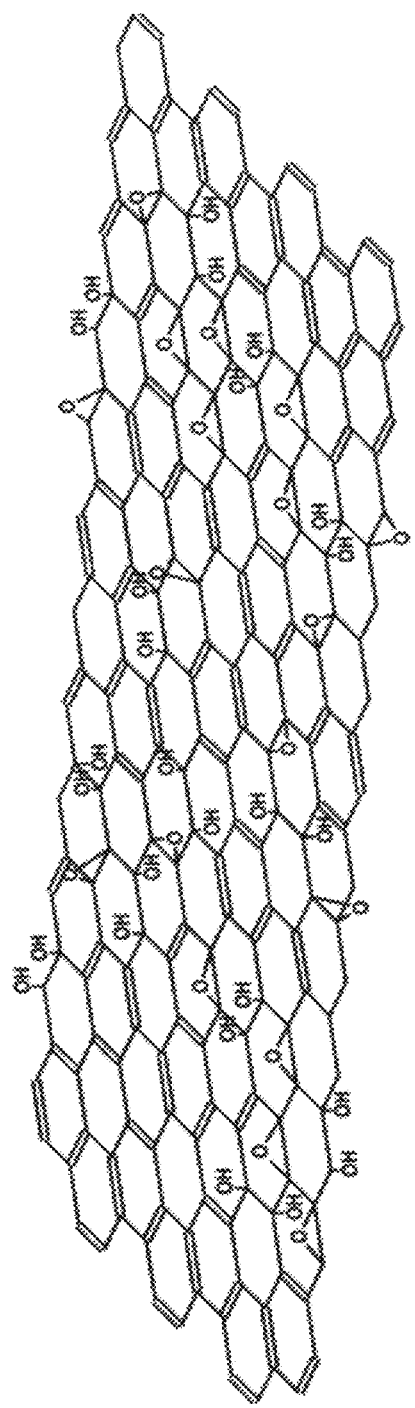
FIG. 7 depicts a tentative structure of graphene oxide.
Figure 8:
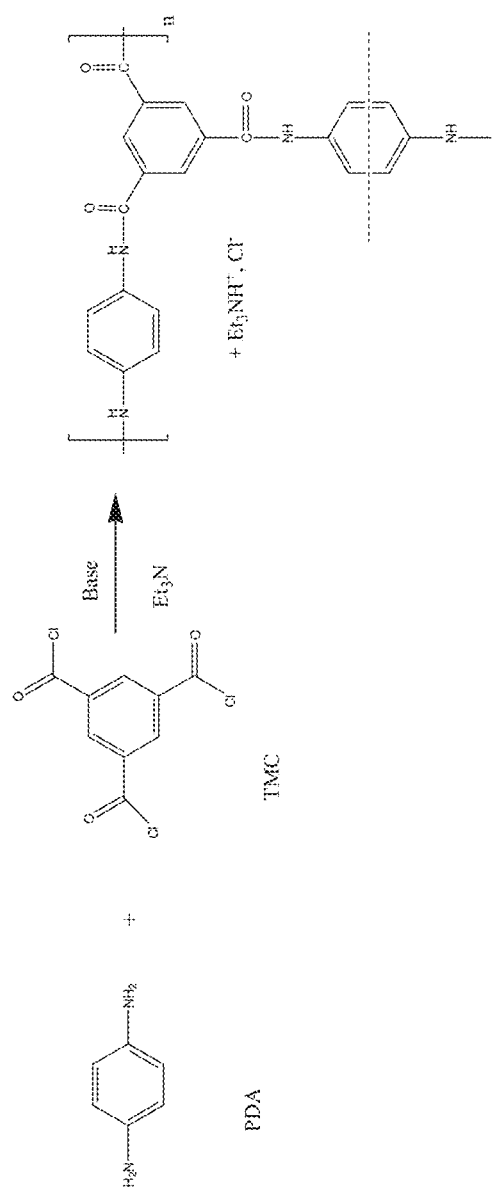
FIG. 8 illustrates the formation of polyamides from phenylene diamine and trimesoyl chloride.

Notes:
++Membrane #3 was made much earlier than the others listed, and does not reflect typical performance such as membrane #1
+Membrane is infused with GO
*PAC was used in the feed at 40 mg/L With reference to FIG. 4, in at least one embodiment, PDA monomer along with graphene-oxide (r-GO) is added to a PS membrane in a very thin layer (equation 1). Subsequently, an aliquot of TMC is added (equation 2) and mixed with the PDA layer to give an interfacial polymerization that gives a cross-linked PA in which the r-GO is suspended (equation 3). In one embodiment, about 1.0 equivalent of TMC may be added to about 1.5 equivalents of PDA. In other embodiments, other ratios of components could be used. For instance, about 0.75-1.25 equivalents of TMC may be added to about 1.5 equivalents of PDA. The mixing-polymerization step may be carried out by a roller exerting pressure that helps orient the r-GO plates parallel to the membrane surface. The resulting membrane is then detached from an inert support layer (not shown) and may be cut into finished membranes of a desired size. The structures of the PDA and TMC monomers are shown in FIG. 4, the tentative structure of r-GO is shown in FIG. 7 (He et al., *Chemical Physics Letters*, 1998, 287: 53), and the structures for the formation of PA from PDA and TMC are shown in FIG. 8. Although the exact structure of GO is unknown, it appears to include sections of graphene interrupted by "oxidized" areas that are water permeable and which indicate a chemical modification of graphene (see FIG. 4). It is important to note that the sizes and shapes of the r-GO's are variable. Furthermore, the embodiments are not limited by the thickness of the membrane, which can range from a few nanometers, to 1-1000 or microns, or more.

With reference again to FIG. 4, in one exemplary embodiment, synthesis of GO-containing nanofiltration membranes may be accomplished as follows. Membranes are hand-cast on PS ultrafiltration membranes (Sterlitech Corporation) via interfacial polymerization. The PS (polysulfone) membrane are put in deionized water for 12 hours, then removed from the water and taped on a glass plate. In a flask, 4 g of m-phenylene diamine (PDA) is dissolved in 120 ml of water. In a separate flask, 80 mL of 0.001-0.5% (w/v) r-GO (Graphene Laboratories Inc.) is dispersed in 80 ml of water and sonicated for 45 min. Then, the PDA solution 2% (w/x) is mixed with r-GO solution making a total of 200 ml. Next, 20 mL of the resulting solution is poured onto the PS membrane and allowed to contact the membrane surface for at least 3 min, and the excess solution is expelled with a rubber roller. Subsequently, about 20 mL of TMC in hexane 0.1% (w/v) is poured onto the membrane. After about 1 min, the excess TMC solution is poured off and the resulting membranes are rinsed with pure hexane, washing off any residual reagents. After the membrane is dried at room temperature, it is immersed in deionized water until use.

It is understood that the above amounts are not intended to be limiting, and that other ranges for the components are contemplated. For instance, about 3-5 g of PDA may be dissolved in 120 ml of water, about 60-100 mL of 0.001-0.5% (w/v) GO may be dispersed in 80 ml of water and sonicated for about 30-60 min. PDA solution of about 1.5-2.5% (w/x) may be mixed with GO solution. About 15-25 mL of the resulting solution may be poured onto the PS membrane and allowed to contact the membrane surface for at least about 2 min. About 15-25 mL of TMC in hexane 0.1% (w/v) may be poured onto the membrane.

The membranes according to the embodiments described herein have shown increased water flux (as much as three fold) that has persisted for several hours and has been shown to be repeatable and reproducible. One of the major considerations in the application of RO processes is energy utilization, and in the case of desalination of sea water, the energy costs amount to 44% of the total cost, per assessments by the International Desalination Association and the United States Environmental Protection Agency. Under the circumstances, GO-PA and similar composites offer an extraordinary potential for improved nano-composite materials for possible use in the entire spectrum of membrane technologies including microfiltration, ultrafiltration, nanofiltration and RO membranes with enhanced water flux. Superior antifouling properties of these membranes are also anticipated without compromising their rejection characteristics. In fact, it is quite possible that the new composites evolved might have superior rejection characteristics as well, an important factor in RO and nanofiltration applications. Equally important is the fact that these nano-composite membranes could advance industrial separation processes.

As indicated above, embodiments may include developing polyamide composite membranes, infused with nano-objects. Additionally, the membranes may contain nano-objects (NOs) alone or in combination with other NOs. We have demonstrated that the GO modified membranes show superior aqueous transport and rejection, and lower membrane fouling. This concept will be employed in water applications including wastewater treatment, water reclamation and reuse, desalination, brackish water treatment, and industrial separations.

Embodiments may include the synthesis of new polyamides with the presence of other (a) tertiary amine bases, or (b) corresponding quaternary ammonium ions and (c) zwitterionic structures as shown in various schemes using the protocols described there. This will also include similar modification of the NOs including graphene and graphene oxides (GOs). Embodiments may also include fabrication of flat-sheet polymer composite membranes infused with different concentrations of nano-objects will be undertaken. As discussed above, four types of polymers may be explored using different curing methods. Each type of polymer may be employed individually, and in combination with the following nanomaterials in different concentrations: graphene derivatives such as graphene oxide, and zeolite nanocrystals. Membrane tests in plate-and-frame cells may be performed for a priori evaluation using permeate fluxes and TOC rejections for initial screening of the best candidates among variations in polymer type, polymer reaction conditions nanomaterial type, and nanomaterial concentration using as test solution a secondary clarified wastewater from a water reclamation plant after being passed through a 0.45 micron filter for eliminating microorganisms. The short-listed or feasible candidates will be more rigorously tested for performance metrics at different trans-membrane pressures for mechanical integrity, compression resistance, fouling and flux decline patterns, and rejection characteristics. The organic rejections will be evaluated in terms of TOC, $UV_{254}$, BOD and COD and membrane fouling. Membrane cleaning tests using various cleaning agents commonly used such as alkalies, acids, surfactants, redox chemicals, and enzymes will address the chemical tolerance of these membranes and also subsequently investigate their cleaning efficiencies pertaining to fouling control, permeate flux recovery, and rejection properties. Membrane autopsy studies using spectroscopic and microscopic tools will be employed (discussed in the experimental section); and bio-molecular tools might be used, if necessary, for obtaining more detailed information on biological, organic and inorganic fouling. Limited membrane filtration tests may be conducted using feeds containing adsorbents such as powder activated carbon (PAC) to observe effects of membrane defouling. The PAC will simultaneously remove most trace-level micro-pollutants exemplified by endocrine disrupting chemicals (EDCs) such as pharmaceutical and personal care products (PPCPs), pesticides and solvents, as previously discussed.

Future work may involve collaboration with the membrane industry to develop hollow-fiber membranes based on the work with flat-sheet membranes. The development of optimized polymer nanocomposite membranes in flat-sheet formats shall be translated to superior hollow-fiber membranes for efficient use in membrane bioreactor (MBR) processes and other integrated membrane systems for various applications.

TABLE 2

Effluent characteristics after secondary treatment from water reclamation utilities

| Constituent (concentration) | Los Angeles County Sanitation Districts | Southern Nevada Water Authority | Orange County Water District |
|---|---|---|---|
| BOD (mg/L) | 26 mg/L | 45 mg/L | 35 mg/L |
| COD (mg/L) | 70 mg/L | 120 mg/L | 130 mg/L |
| TOC (mg/L) | 20 mg/L | 26 mg/L | 25 mg/L |
| TDS (mg/L) | 985 mg/L | 1140 mg/L | 850 mg/L |
| TSS (mg/L) | 20 mg/L | 38 mg/L | 38 mg/L |
| pH | 7.4 | 7.5 | 7.5 |
| Total plate count (cfu/100 mL) | $7.8 \times 10^5$ | $9.85 \times 10^5$ | $8.5 \times 10^5$ |
| Bicarbonate (mg/L) | 181 mg/L | 241 mg/L | 252 mg/L |
| Hardness (mg/L) | 298 mg/L | 360 mg/L | 375 mg/L |
| Turbidity (NTU) | 350 NTU | 198 NTU | 30 NTU |
| Ammonia-N (mg/L) | 33 mg/L | 37 mg/L | 31 mg/L |
| Nitrate (mg/L) | 0.3 mg/L | 2.4 mg/L | 20 mg/L |
| Phosphate (total) (mg/L) | 5.1 mg/L | 10 mg/L | 10 mg/L |
| Sulfate (mg/L) | 250 mg/L | 275 mg/L | 240 mg/L |
| Chloride (mg/L) | 290 mg/L | 310 mg/L | 285 mg/L |

Source Water.

Reclaimed water in the form of effluent after secondary treatment from a water reclamation facility of the Los Angeles County Sanitation Districts may be used in this research. Typical compositions of reclaimed wastewaters from other utilities are presented in Table 2.

Microbial Culture.

The microorganisms may be obtained from the activated sludge system of the above biological wastewater treatment plant. The microbial culture may be acclimated in a chemostat reactor system. The acclimation will be achieved at a pH of 7-8 and a temperature of 20□C, with appropriate dissolved oxygen levels. The microbial population may be added to feed water at appropriate biomass concentrations to assess the extent of fouling in flat-sheet membranes.

Membranes.

The filtration tests may employ flat-sheet membranes using the plate-and-frame test cell. The membranes may be fabricated from polymers infused with nanoparticles. The flat-sheet membranes may be tested for various scenarios including those pertaining to membrane bioreactor systems for transport properties, fouling resistance and rejection characteristics.

General Analytical Techniques.

The physicochemical characteristics of test waters may be determined using well established procedures outlined in Standard Methods (2005). The TOC may be measured using a total carbon analyzer. The ultraviolet absorbance at 254 nm ($UV_{254}$) may be measured using a Perkin Elmer UV-visible spectrophotometer with a 1-cm quartz cell. The color may be determined using a color comparator Aqua Tester. The turbidity may be determined using nephelometric techniques. Alkalinity and hardness may be measured by acid titration and atomic absorption spectrophotometry, respectively. Other water quality constituents may be monitored, including the following: BOD (biochemical oxygen demand), COD (chemical oxygen demand), total nitrogen, ammonia-nitrogen ($NH_3$—N), nitrate, total phosphorus, total suspended solids (TSS), total dissolved solid (TDS), turbidity, carbonates, sulfates, chlorides, and biomass.

Membrane Filtration Tests.

Figure 9:
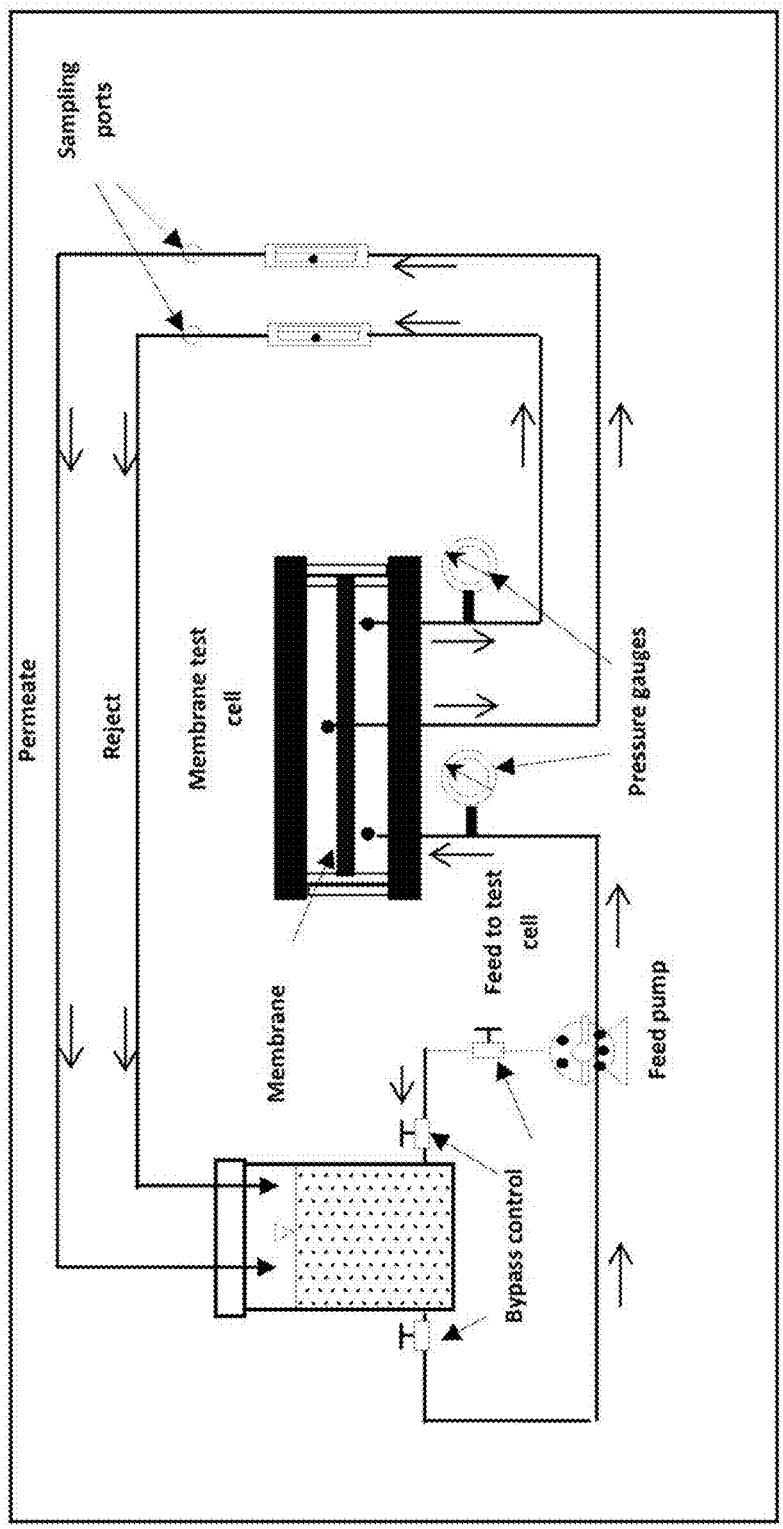
FIG. 9 is a schematic illustration of a plate-and-frame test cell for flat-sheet membranes according to an embodiment.

The laboratory-scale flat-sheet membrane filtration tests represent an economic means for optimizing membrane material formulation and evaluating its fouling potential and rejection characteristics. The tests may be conducted in the Osmonics Sepa CF Type I test cell (GE Osmonics, Minetonka, Minn.), shown in FIG. 9, as recommended by the U.S. Environmental Protection Agency for evaluating flat-sheet membranes.

Membrane Surface Characterization Techniques.

Membrane surface characterization tests may be conducted to evaluate the extent and type of membrane fouling as described elsewhere (Song et al, Journal of Membrane Science, 240 (1), 143-160, 2004; Yang et al., Journal of Membrane Science, 287, 146-156, 2007). The characterization techniques employed may at least include the following: contact angle measurements, electrophoretic zeta-potential measurements, atomic force microscopy (AFM), scanning electron microscopy (SEM), transmission electron microscopy (TEM), attenuated total reflection-Fourier transform infra-red spectroscopy (ATR-FTIRS), X-ray photo-electron spectroscopy (XPS), and confocal laser scanning microscopy (CLSM).

Membrane Characterization

1. Materials and Methods

All materials are purchased from Alfa Aesar unless otherwise noted. Polyethersulfone (GE Osmonics YMPTSP3001 molecular weight cut off is about 5000 daltons) was obtained from Sterlitech Corporation. Graphene Oxide solution was purchased from Graphene Supermarket.

2. Synthesis and Preparation of Graphene Oxide Incorporated PolyAmide (PA) Membranes Membranes were hand-cast on polyethersulfone (PES) ultrafiltration membranes (UF) provided by Sterlitech via interfacial polymerization. Polysulfone support membrane was put in deionized water for 12 hours, then removed from the water and taped on a flat glass plate. In a flask, 4 g of m-phenylene diamine (MPD) was dissolved in 120 ml of water. In a separate flask, 0.5% (w/v) graphene oxide (purchased from graphene supermarket) was prepared in 80 ml of water and ultrasonicated for 45 min. Then m-phenylene diamine solution was mixed with graphene oxide solution making a total of 200 ml of 2% (v/w) m-phenylene diamine and 0.5% (w/v) graphene oxide aqueous solution. m-phenylene diamine and graphene oxide solution were then poured onto the membrane and allowed to contact the polysulfone support for at least 3 min. Then the excess solution rolled with a rubber roller firmly. Then, 0.1% (w/v) trimesoyl chloride (TMC) in hexane was poured onto the membrane. After 1 minute reaction, the TMC solution was poured off and the resulting membranes were rinsed using hexane to wash away residual reagents. After membrane was air dried at room temperature or annealed at 60° C. for 10 min depending on the experiment, it was immersed in deonized water until use. The synthesis and fabrication of polyamide (PA)-Graphene Oxide nanocomposite membranes are shown in FIGS. 4 and 8 respectively.

3. Preparation of Graphene Oxide Incorporated Sulfonated or Non-Sulfonated Poly (Tetrabutyl Ammounium Styrene Sulfonate-Co-Styrene-Co-4-Chloromethyl Styrene) P(BASS-S-CMS)-PVDF Blend Membranes Membranes were prepared by solution casting according to the procedure reported. (Li M., PhD thesis. Development of polystyrene sulfonic acid-polyvinylidene fluoride (PSSA-PVDF) blends for direct methanol fuel cells (DMFCS), University of Southern California, 2014, and U.S. provisional application Ser. No. 62/034,826; the entire disclosures of which are hereby incorporated by reference).

First, GO was sonicated for 45 min. 15% wt P(BASS-S-CMS) and PVDF 80% were dissolved in N,N-Dimethylformamide (DMF) at separate beakers at ambient temperature. After the entire P(BASS-S-CMS) was dissolved, sonicated 5% wt GO was added to the beaker slowly while stirring the solution vigorously so that GO sheets won't stack up. After mixing P(BASS-S-CMS) and GO for 30 minutes, PVDF dissolved in DMF was added to the beaker and the solution was stirred for another 15 minutes at ambient temperature. The polymer blend was then poured into a petri dish and transferred to the oven preheated at 70° C. or 165° C. depending on desired experimental conditions. After annealing for 2 hours, the membranes are quickly quenched in water at 25° C. The corresponding sulfonated membranes were prepared according to the literature. (Li M., PhD thesis. Development of polystryrene sulfonic acid-polyvinylidene fluoride (PSSA-PVDF) blends for direct methanol fuel cells (DMFCS), University of Southern California, 2014)

4. Water Permeability and Particle Rejection Studies of Graphene Oxide Incorporated PolyAmide (PA) Membranes The initial work on the project involved the development of polymer synthesis protocols and synthesis conditions including reaction times and curing procedures. Subsequently, graphene oxide was incorporated as nanomaterial into the polymers at a set proportion. The membranes used in the series of preliminary tests were prepared by interfacial polymerization with monomer on a commercial polyether sulfone (PES) ultrafiltration membrane base with a nominal pore size of 0.08 micron and molecular weight cutoff off (MWCO) of 10,000 Daltons.

Aromatic crosslinked polyamide membranes are well-known for desalinating salt water effectively between 80-90% (REF), therefore the incorporation of graphene oxide on the water permeation properties were studied. There were several membranes prepared with variations in annealing temperature, or reaction time in the preparation protocol and their effects on the membrane filtration properties were also studied (Table 3). A flow rate of 100 mL/min corresponds to a membrane permeate flux of 2500 L/m²/hr based on the membrane film dimensions of for the small cell tests.

TABLE 3

Reaction conditions of prepared membranes

| Membrane No | Annealing at 68° C. | GO in polymer matrix | GO as additional layer on the surface of the membrane |
|---|---|---|---|
| 3 | yes | No | no |
| 4 | yes | Yes | no |
| 5 | no | Yes | no |
| 8 | yes | Yes | yes |
| 9 | no | Yes | yes |

It was observed that the permeate flux of membrane 4 was almost 3 fold compared to membrane 3 that is a polyamide control membrane made in the same conditions (Table 4). Membrane 5 that was similar to membrane 4 except it was not annealed after the reaction showed relatively higher water flux. Membrane 8 contained graphene oxide both in the polymer matrix and on the surface of the membrane as additional layer and it was observed that additional coating of GO decreased flux considerably compared to membranes 4 and 5. Membrane 9 was similar to membrane 8 except it was not annealed after membrane preparation and its water flux was similar to that of membrane 8. It is notable that the permeate flux of polyamide membranes decreased more rapidly compared to GO incorporated membranes, for instance the initial flux of membrane 3 decreased 4 fold in 3 hours whereas membrane 4 that was prepared at the same conditions with membrane 3 except GO incorporation in the polymer matrix showed only 30% decrease in permeate flux in 3 hours.

Table 5 shows the correlation between sodium chloride concentration and corresponding electrical conductivities and osmotic pressures. All membranes showed weak NaCl rejection. It was expected incorporation of GO will decrease the rejection characteristics of membranes. However, it was clear that GO incorporation did not effect the rejection (Table 4).

TABLE 4

Water flux and NaCl rejection properties of membranes

| Membrane | #3 | #4 | #5 | #8 | #9 |
|---|---|---|---|---|---|
| TMP (psi) | | | 60 | | |
| Initial flux (L/m²/h) | 300 | 325 | 450 | 150 | 200 |
| Flux after 1 hr (L/m²/h) | 75 | 250 | 275 | 125 | 125 |
| Flux after 3 hr (L/m²/h) | 75 | 250 | 275 | 125 | 125 |
| Normalized flux after 3 h | 0.25 | 0.77 | 0.61 | 0.83 | 0.63 |
| Initial conductivity (µS/cm) | 2030 | 2080 | 2060 | 2030 | 2070 |
| Conductivity after 1 hr (µS/cm) | 1700 | 1830 | 1780 | 1740 | 1720 |
| Conductivity after 3 hr (µS/cm) | 1710 | 1820 | 1760 | 1700 | 1710 |
| Rejection after 3 hr (%) | 15.8 | 12.5 | 14.6 | 16.3 | 17.4 |

TABLE 5

Correlation between sodium chloride concentration and electrical conductivity, and the corresponding osmotic pressure.

| NaCl (mg/L) | Conc. Cl⁻ (mg/L) | Conductivity (µS/cm) | Osmotic pressure (bar) | (psi) |
|---|---|---|---|---|
| 0 | 0 | 2.31 | 0 | 0 |
| 1 | 0.6 | 4.92 | 0.001 | 0.01 |
| 5 | 3.0 | 12.3 | 0.004 | 0.06 |
| 10 | 6.1 | 23.7 | 0.008 | 0.12 |
| 100 | 60.5 | 210 | 0.083 | 1.21 |
| 1000 | 605 | 1960 | 0.833 | 12.1 |

Since we observed that NaCl rejection properties of membranes were weak, we used wastewater having total organic contaminants (TOC) that are bigger as filtration particles. In the present study, the membranes designated as membrane 10 was a polyamide membrane without GO whereas membrane 11 had GO in the polymer matrix prepared at the same conditions.

TABLE 6

Performance comparison of various membranes

| | Membrane | | |
|---|---|---|---|
| | #10 | #11 | PES UF |
| Time (h) | Permeate flux (L/m²/h) | | |
| 0 | 265 | 275 | 300 |
| 0.5 | 150 | 140 | 150 |
| 1 | 50 | 50 | 40 |
| 2 | 18 | 40 | 40 |
| 3 | 10 | 40 | 30 |

TABLE 6-continued

Performance comparison of various membranes

| | Membrane | | |
|---|---|---|---|
| Time (h) | #10 | #11 | PES UF |
| | Permeate flux (L/m$^2$/h) | | |
| Organic (TOC) rejection (%) | 44.4 | 55.9 | 3.4 |

The results presented in Table 6 provide a performance comparison of various membranes based on permeate flux and TOC rejection. Membrane 10 and 11 had similar initial fluxes about 270 L/m$^2$/h, however after 3 hours the permeate flux of membrane 11 was 4 fold higher than membrane 10. TOC rejection increased with incorporation of GO from 44.4% to 55.9%. The UF PES commercial membrane had permeate similar to GO incorporated polyamide membranes except it had much lower TOC rejection, about 3.4%.

5. Water Permeability and Particle Rejection Studies of P(BASS-S-CMS)-PVDF Blend Membranes It has been shown that P(BASS-S-CMS)-PVDF blends formed small domains and after sulfuric acid treatment they showed appreciable potential for water filtration and reclamation applications at high sulfonic acid content (30-40%). However, it is known that high sulfonic acid content membranes could suffer from swelling. This swelling might enlarge the pores leading to decay in rejection properties at long term. For this purpose, we incorporated GO into the blend matrix to enhance the water flux at lower sulfonic acid content. Desirable properties of GO for water filtration applications were discussed above.

Figure 12:
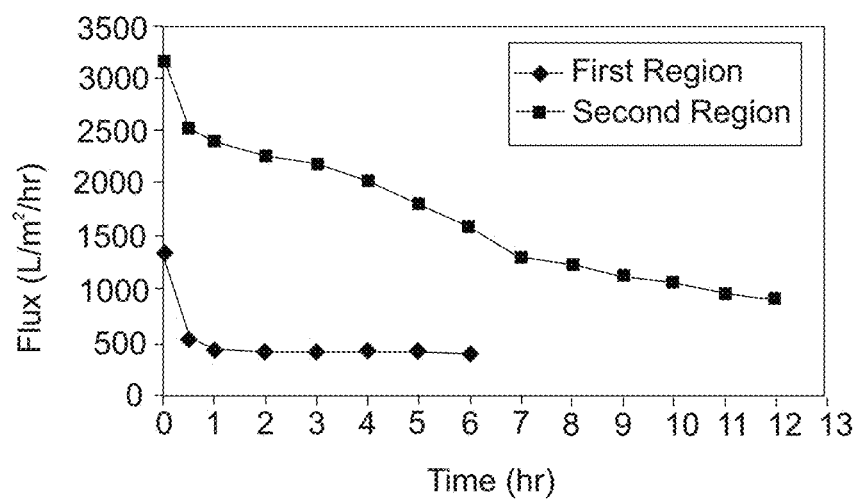
FIG. 12 provides permeate flux of the first and second regions of sulfonated P(BASS-S-CMS)-PVDF annealed at 70° C.

Sulfonated P(BASS-S-CMS)-PVDF blend membranes were annealed at 70° C. It was observed that membranes were not uniformly coated. It was observed that some regions had macro defects, as shown by the white cloudy parts. A first region that did not have remarkable white spots and looked homogeneous was observed. A second region had GO rich and poor regions, two white circles and a third region had one remarkable circle. Therefore, the first and second regions were used for membrane filtration to see the effect of white cloudy portion on water permeability. The flux pattern for the first region showed similar trends to GO incorporated polyamide membranes in the sense that it came to a stable value at 500 L/m$^2$/hr and did not show a further decrease (FIG. 12). However, sulfonated P(BASS-S-CMS)-PVDF blend membranes had much higher water permeation compared to GO PA membranes. On the other hand, the third region had the initial flux higher than any other prior membrane filtrations possibly due to blend incompatibilization and graphene sheet stacking Opaque membranes at low temperatures was also reported previously.[70] which could be due to the blend incompatibilization that may yield larger domains and higher permeations. The domain size in third region seemed to vary greatly throughout the membrane possibly diminishing the water permeation with time. Rapid decrease in water permeation in region III can also be explained by fouling. The permeation of GO rich region, the first region, was not significantly affected over time. It is also noteworthy that the membranes were brittle and very hard to handle.

Sulfonated P(BASS-S-CMS)-PVDF blend membranes were annealed at 165° C. The membranes were much more transparent and stronger compared to the ones annealed at 70° C. The structure of membranes was visually more homogeneous with no apparent defects as seen in the previous membranes. Some wavy coatings were observed probably due to hand-made fabrication. The membranes showed similar permeated flux with a first region of membranes annealed at 70° C. which is attributed to the enhanced blend compatibility at high temperatures. The membranes were also tested towards GO leaching. GO leaching or membrane damage was not observed after high pressure filtration.

Figure 13:
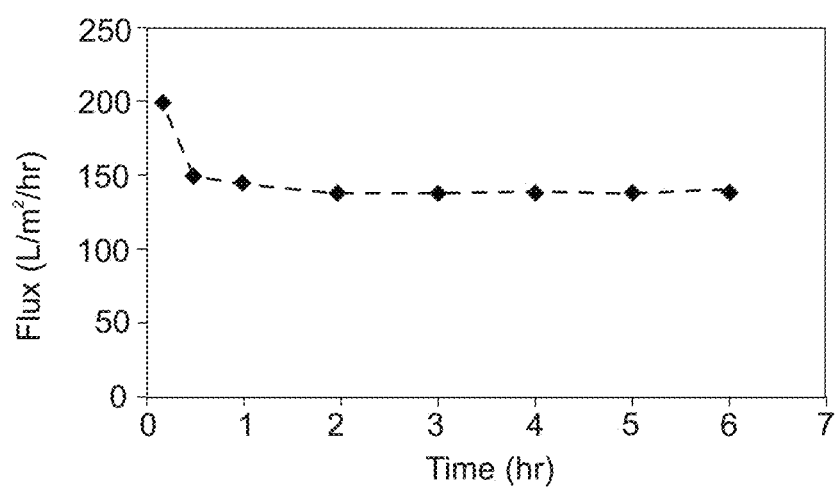
FIG. 13 provides permeate flux data observed during membrane testing using wastewater.

More surprising results were seen for non-sulfonated P(BASS-S-CMS)-PVDF blends. Although P(BASS-S-CMS)-PVDF blend membranes are expected to be highly hydrophobic and did not show any water permeation even at 60 psi, GO incorporated P(BASS-S-CMS)-PVDF blend membranes showed considerably high water permeation. (FIG. 13) The water flux was stable after 0.5 hour showing minor clogging or degradation due to fouling indicating the major enhanced effect of GO incorporation on the fouling and water flux properties of membranes.

Embodiments disclosed herein may constitute a transformative advancement in the development of superior membranes with better fouling resistance, transportive properties, and selectivity, with a novel combination of polymer with nanomaterial infusion employing graphene oxide (GO), graphene derivatives, and zeolites. It is anticipated that these membranes will have significantly superior properties regarding fouling resistance, rejection characteristics, and permeate fluxes. They will find wide application in most separations including those related to water and wastewater treatment, water reclamation and reuse. More importantly, the novelty will extend to other applications in the major industries such as chemicals, petroleum, pharmaceuticals, electronics, and several others. The disclosed embodiments highlight the importance of polymer and nanomaterials chemistry for abatement of membrane fouling and control of flux decline without compromising rejection characteristics. Fouling-resistant and high-flux membranes will promote integrated membrane technologies for wider use in environmental, industrial and commercial applications by making them more efficient and economical.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

Asatekin, A., Menniti, A., Kang, S., Elimelech, M., and Mayes, A. M. (2006). Antifouling nanofiltration membranes for membrane bioreactors from self-assembling graft polymers. Journal of Membrane Science, 285 (1-2), 81-89.

Asatekin, A., Kang, S., Elimelech, M., and Mayes, A. M. (2007). Anti-fouling ultrafiltration membranes containing polyacrylonitrile-graft-poly(ethylene oxide) comb copolymer additives. Journal of Membrane Science, 298 (1-2), 136-146.

Bae, T., and Tak, T. (2005). Effect of TiO2 nanoparticles on fouling mitigation of ultrafiltration membranes for activated sludge filtration. Journal of Membrane Science, 249(1-2), 1-8.

Bai, J., Zhong, X., Jiang, S., Huang, Y., and Duan, X. (2010). Graphene nanomesh. Nature Nanotechnology, 5(3), 190-194.

Booth, T. J., Blake, P., Nair, R. R., Jiang, D., Hill, E. W., Bangert, U., Bleloch A, and Geim, A. K. (2008). Macroscopic graphene membranes and their extraordinary stiffness. Nano letters, 8(8), 2442-2446.

Chen, H., and Belfort, G. (1999). Surface modification of [poly(ether sulfone)] ultrafiltration membranes by low-temperature plasma-induced graft polymerization. Journal of Applied Polymer Sciences, 72 (13), 1699-1711.

Chennamsetty, R., and Escobar, I. C. (2008). Evolution of a polysulfone nanofiltration Choi, J. H., Jegal, J., and Kim, W. N. (2006). Fabrication and characterization of multi-walled carbon nanotubes/polymer blend membranes. Journal of Membrane Science, 284 (1-2), 406-415.

Choi, J. H., Jegal, J., and Kim, W. N. (2007). Modification of performances of various membranes using MWNTs (multiwalled nanotubes) as a modifier. Macromolecular Symposia, Advanced Polymers for Emerging Technologies, Volumes 249-250, 610-617.

Choi, W., Choi, J., Bang, J., and Lee, J. H. (2013). Layer-by-layer assembly of graphene oxide nanosheets on polyamide membranes for durable reverse-osmosis applications. ACS Applied Materials and Interfaces, 5(23), 12510-12519.

Crittenden, J. C., Trussell, R. R., Hand, D. W., Howe, K. J., and Tchobanoglous, G. 2005). Water Treatment Principles on Design, Second Edition (revised), John Wiley, Hoboken, N.J.

Dong, H. B., Xu, Y. Y., Yi, Z., and Shi, J. L. (2009). Modification of polysulfone membranes via surface-initiated atom transfer radical polymerization. Applied Surface Science, 255 (21), 8860-8866.

Fischbein, M. D., and Drndic, M. (2004). Electron beam nano-sculpting of suspended graphene sheets. Applied Physics Letters, 2008, 93(11), 113107-113107.

Fornasiero, F., Park, H. G., Holt, J. K., Stadermann, M., Grigoropoulos, C. P., Noy, A., and Bakajin, O. (2008). Ion exclusion by sub-2-nm carbon nanotube pores. Proceedings of the National Academy of Sciences, 105(45), 17250-17255.

Fritzmann, C., Löwenberg, J., Wintgens, T., and Melin, T. (2007). State-of-the-art of reverse osmosis desalination. Desalination, 216 (1), 1-76.

Geise, G., Lee, H. S., Miller, D. J., Freeman, B. D., McGrath, J. E., and Paul, D. R. 2010). Water purification by membranes: the role of polymer science. Journal of Polymer Science, Part B: Polymer Physics, 48, 1685-1718.

Greenlee, L. F., Lawler, D. F., Freeman, B. D., Marrot, B., and Moulin, P. (2009). Reverse osmosis desalination: water sources, technology and today's challenges. Water Research, 43, 2317-2348.

Hashimoto, A., Suenaga, K., Gloter, A., Urita, K., and Iijima, S. (2004). Direct evidence for atomic defects in graphene layers. Nature, 430 (7002), 870-873.

Hausman, R., Gullinkala, T., and Escobar, I. C. (2009). Development of low-biofouling polypropylene feed spacers for reverse osmosis. Journal of Applied Polymer Science, 114 (5), 3068-3073.

Holt, J. K., Park, H. G., Wang, Y., Stradermann, M., Artyukhin, A. B., Grigoropoulos, C. P., Noy, A., Bakajin, O. (2006). Fast mass transport through sub-2-nanometer carbon nanotubes. Science, 312, 1034-1037.

Hu, W., Peng, C., Luo, W., Lv, M., Li, X., Li, D., Huang Q., and Fan, C. (2010). Graphene-based antibacterial paper. ACS Nano, 4(7), 4317-4323.

Hydronautics Press Release (2007). Integrated membrane solutions at work in Southern Spain; (available from: http://www.membranes.com/press/Escombreras), released on Jan. 20, 2007.

Imai, A., Fukushima, T., Matsushinge, K., Kim, Y. H., and Choi, K. (2002). Characterization of dissolved organic matter in effluents from wastewater treatment plants. Water Research, 36(4), 859-870.

Inui, N., Mochiji, K., Moritani, K., and Nakashima, N. (2010). Molecular dynamics simulations of nanopore processing in a graphene sheet by using gas cluster ion beam. Applied Jiang, D. E., Cooper, V. R., and Dai, S. (2009). Porous graphene as the ultimate membrane for gas separation. Nano letters, 9 (12), 4019-4024.

Jiang, Y., Wang, W. N., Liu, D., Nie, Y., Li, W., Wu, J., Zhang, F., Biswas, P., and Fortner, J. D. (2015). Engineered crumpled graphene oxide nanocomposite membrane for advanced water treatment processes. Environmental Science and Technology, 49(11), 6846-6854.

Kilduff, J. E., and Weber, W. J., Jr. (1992). Transport and separation of organic molecules in ultrafiltration membranes. Environmental Science and Technology, 26 (3), 569-577.

Kim, K. S.; Lee, K. H.; Cho, K.; and Park, C. E. (2002). Surface modification of polysulfone ultrafiltration membranes by oxygen plasma treatment. Journal of Membrane Science, 199 (1-2), 135-145.

Kim, J., and Van der Bruggen, B. (2010). The use of nanoparticles in polymeric and ceramic membrane structures: Review of manufacturing procedures and performance improvement for water treatment. Environmental Pollution, 158 (7), 2335-2349.

Kimura, S., and Sourirajan, S. (1967). Analysis of data in reverse osmosis with porous cellulose acetate membranes used. AIChE Journal, 13 (3), 497-503.

Kong, C., Shintani, T., and Tsuru, T. (2010). Pre-seeding-assisted synthesis of a high performance polyamide-zeolite nano-composite membrane for water purification. New Journal of Chemistry, 34, 2101-2104.

Krasheninnikov, A. V., Nordlund, K., Sirvio, M., Salonen, E., and Keinonen, J. (2001). Formation of ion-irradiation-induced atomic-scale defects on walls of carbon nanotubes. Physical Review B, 63(24), 245405.

Krasheninnikov, A. V., Nordlund, K., and Keinonen, J. (2002). Production of defects in supported carbon nanotubes under ion irradiation. Physical Review B, 65(16), 165423.

Kull, K. R., Steen, M. L., and Fisher, E. R. (2005). Surface modification with nitrogen-containing plasmas to produce hydrophilic, low-fouling membranes. Journal of Membrane Science, 246, 203-215.

Lee, C., Wei, X., Kysar, J. W., and Hone, J. (2008). Measurement of the elastic properties and intrinsic strength of monolayer graphene. Science, 321(5887), 385-388.

Li, L., Dong, J., Nenoff, T. M., and Lee, R. (2004). Desalination by reverse osmosis using MFI zeolite membranes. Journal of Membrane Science, 243 (1), 401-404.

Li, H., Cao, Y., Qin, J., Jie, X., Wang, T., Lin, J., and Yuan, Q. (2006). Development and characterization of anti-fouling cellulose hollow fiber UF membrane for oil-water separation. Journal of Membrane Science, 279(1-2), 328-335.

Li., H., Gao, Y., Pan, L., Zhang, Y., Chen, Y., and Sun, Z. (2008a). Electrosorptive desalination by carbon nanotubes and nanofibers electrodes and ion-exchange membranes. Water Research, 42, 4923-4928.

Li, L., Yan, G., Wu, Y., Yu, X., and Guo, Q. (2008b). Surface-initiated atom transfer radical polymerization from polyimide films and their anti-fouling properties. Journal of Macromolecular Science, Part A: Pure and Applied Chemistry, 45 (10), 828-832.

Li, L., Yan, G., and Wu, J. (2009). Modification of polysulfone membranes via surface-initiated atom transfer radical polymerization and their antifouling properties. Journal of Applied Polymer Science, 111 (4), 1942-1946.

Lind, M. L., Ghosh, A. K., Jawor, A., Huang, X., Hou, W., Yang, Ya., and Hoek, E. M. V. (2009). Influence of zeolite crystal size on zeolite-polyamide thin film nanocomposite membranes. Langmuir, 25 (17), 10139-10145.

Liu, S., Zeng, T. H., Hofmann, M., Burcombe, E., Wei, J., Jiang, R., Kong J., and Chen, Y. (2011). Antibacterial activity of graphite, graphite oxide, graphene oxide, and reduced graphene oxide: membrane and oxidative stress. ACS Nano, 5(9), 6971-6980.

Loeb, S., and Sourirajan, S. (1963). Seawater demineralization by means of an osmotic membrane. Saline Water Conversion, Advances in Chemistry (series), Vol. 38, Chap. 9, pp. 117-132, American Chemical Society, Washington, D.C.

Lucchese, M. M., Stavale, F., Ferreira, E. H., Vilani, C., Moutinho, M. V. O., Capaz, R. B., Achete C. A., and Jorio, A. (2010). Quantifying ion-induced defects and Raman relaxation length in graphene. Carbon, 48(5), 1592-1597.

Matsuura, T. (1994). Synthetic Membranes and Membranes Separation Processes. CRC press, Boca Raton, Fla.

Maruf, S. H., Ahn, D. U., Pellegrino, J., Killgore, J. P., Greenberg A. R., and Ding, Y. (2012). Correlation between barrier layer Tg (glass temperature) and a thin-film composite polyamide membrane performance: effect of chlorine treatment. Journal of Membrane Science, 405-406, 167-175.

Maximous, N., Nakhle, G., Wan, W., and Wong, K. (2009). Preparation, characterization and performance of $Al_2O_3$/PES membrane for wastewater filtration. Journal of Membrane Science, 341(1-2), 67-75.

Maximous, N., Nakhle, G., Wan, W., and Wong, K. (2010). Performance of a novel characterization $ZrO_2$/PES membrane for wastewater filtration. Journal of Membrane Science, 352(1-2), 222-230.

Nair, R. R., Wu, H. A., Jayaram, P. N., Grigorieva, I. V., and Geim, A. K. (2012). Unimpeded permeation of water through helium-leak-tight graphene-based membranes. Science, 335 (6067), 442-444.

Peng, W., Escobar, I. C., and White, D. B. (2004). Effects of water chemistries and properties of membrane on the performance and fouling: a model development. Journal of Membrane Science, 238 (1-2), 33-46.

Peng, W., and Escobar, I. C. (2005). Evaluation of factors influencing membrane performances. Environmental Progress, 24 (4), 382-399.

Perreault, F., Tousley, M. E., and Elimelech, M. (2013). Thin-film composite polyamide membranes functionalized with biocidal graphene oxide nanosheets. Environmental Science and Technology Letters, 1(1), 71-76.

Pieracci, J., Crivelle, J. V., and Belfort, G. (2002). Increasing membrane permeability of UV-modified poly (ether sulfone) ultrafiltration membranes. Journal of Membrane Science, 202 (1-2), 1-16.

Pirbazari, M., Kim, S. H., Badriyha, B. N., and Ravindran, V. (1996). Hybrid membrane filtration process for leachate treatment. Water Research, 30 (11), 2691-2706.

Rahimpour, A., Madaeni, S. S., Zereshki, S., and Mansourpanah, Y. (2009). Preparation and characterization of modified nano-porous PVDF membrane with high anti-fouling property using UV photo-grafting. Applied Surface Science, 255 (16), 7455-7461.

Rajbartoreh, A. R., Wang, B., Shen, X., and Wang, G. (2011). Advanced mechanical properties of graphene paper. Journal of Applied Physics, 109 (1), 014306-014306.

Ravindran, V., Tsai, H. H., Williams, M. D., Pirbazari, M. (2009). Hybrid membrane bioreactor technology for small water treatment utilities: process evaluation and primordial considerations. Journal of Membrane Science. 344 (1-2), 39-54.

Richards, H. L., Baker, P., G. L., and Iwuoha, E. (2012). Metal nanoparticle modified polysulfone membranes for use in wastewater treatment: a critical review. Journal of Surface Engineered Materials and Advanced Technology, 2, 183-193.

Sint, K., Wang, B., and Kral, P. (2008). Selective ion passage through functionalized graphene nanopores. Journal of American Chemical Society, 130(49), 16448-16449.

Snyder, S. A., Adham, S. Redding, A. M., Cannon, F. S., DeCarolis, J., Oppenheimer, J., Wert, E., and Yoon, Y. (2007). Role of membranes and activated carbon in the removal of endocrine disruptors and pharmaceuticals. Desalination, 202(1-3), 156-181.

Song, W., Ravindran, V., Pirbazari, M., and Koel, B. E (2004). Nanofiltration of natural organic matter with hydrogen peroxide/ultraviolet radiation ($H_2O_2$/UV) pretreatment: Fouling mitigation and membrane surface characterization. Journal of Membrane Science, 240 (1), 143-160.

Standard Methods (2005). Standard Methods for the Examination of Water and Wastewater, 21st edition, American Public Health Association, American Water Works Association, and Water Environment Federation, Washington D.C.

Su, Y., Li, C., Zhao, W., Shi, Q., Wang, H., Jiang, Z., and Zhu, S. (2008). Modification of polyethersulfone ultrafiltration membranes with phosphorylcholine copolymer can remarkably improve the antifouling and permeation properties. Journal of Membrane Science, 322 (1), 171-177.

Su, Y. L., Cheng, W., Li, C., and Jiang, Z. (2009). Preparation of antifouling ultrafiltration membranes with poly (ethylene glycol)-graft-polyacrylonitrile copolymers. Journal of Membrane Science, 329 (1-2), 246-252.

Suk, M. E., and Aluru, N. R. (2010). Water transport through ultrathin graphene. Journal of Physical Chemistry Letters, 1(10), 1590-1594.

Suk, J. W., Piner, R. D., An, J., and Ruoff, R. S. (2010). Mechanical properties of monolayer graphene oxide. ACS Nano, 4(11), 6557-6564.

Tsai, H. H., Ravindran, V., Williams, M. D., and Pirbazari, M. (2004). Membrane bioreactor process for water denitrification. Journal of Environmental Engineering and Science, 3(6), 507-521.

Tu, S. C., Ravindran, V., and Pirbazari, M. (2005). A pore diffusion model for forecasting the performance of membrane processes. Journal of Membrane Science, 265 (1-2), 29-50.

U.S. Provisional patent application (2013). Yurdacan H. M., Hogen-Esch, T. E., Pirbazari M., Ravindran V. Increased flow reverses osmosis membranes containing nano objects. Ser. No. 61/864,168 (filed with the U.S. Patent and Trademark Office on Aug. 9, 2013).

Van der Bruggen, B. (2009). Comparison of redox initiated graft polymerization and sulfonation for hydrophilisation of polyethersulfone nanofiltration membranes. European Polymer Journal, 45 (7), 1873-1882.

Wang, S., Zhang, Y., Abidi, N., and Cabrales, L. (2009). Wettability and surface free energy of graphene films. Langmuir, 25(18), 11078-11081.

Wei, X., Wang, R., Li, Z., and Fane, A. G. (2006). Development of a novel electrophoresis-UV grafting technique to modify PES UF membranes used in NOM removal. Journal of Membrane Science, 273 (1-2), 47-57.

Wei, D., Liu, Y., Wang, Y., Zhang, H., Huang, L., and Yu, G. (2009). Synthesis of N-doped graphene by chemical vapor deposition and its electrical properties. Nano letters, 9(5), 1752-1758.

Williams, M. D., and Pirbazari, M. (2007). Membrane bioreactor process for removing biodegradable organic matter from water. Water Research, 41 (17), 3880-3893.

Williams, M. D., Ravindran, V., and Pirbazari, M. (2012). Modeling and process evaluation of membrane bioreactor for removing biodegradable organic matter from water. Chemical Engineering Science, 84, 494-511.

Xie, X. L., Maia, Y. W., and Zhou, X. P. (2005). Dispersion and alignment of carbon nanotubes in polymer matrix: a review. Materials Science and Engineering, 49, 89-112.

Yang, C., Kwon, Y. N., and Leckie, J. (2007). Probing the nano- and micro-scales of reverse osmosis membranes: a comprehensive characterization of physicochemical properties of uncoated and coated membranes by XPS, TEM, ATR-FTIR and streaming potential measurements. Journal of Membrane Science, 287, 146-156.

Yoon, K., Hsiao, B. S., and Chu, B. (2009). Formation of functional polyethersulfone electrospun membrane for water purification by mixed solvent and oxidation process. Polymer, 50, 2893-2899.

Zanini, S., Muller, M.; Riccardi, C., and Orlandi, M. (2007). Polyethylene glycol grafting on polypropylene membranes for anti-fouling properties. Plasma Chemistry and Plasma Processes, 27 (4), 446-457.

Zhang, J., Zou, H., Qing, Q., Yang, Y., Li, Q., Liu, Z., Guo X., and Du, Z. (2003). Effect of chemical oxidation on the structure of single-walled carbon nanotubes. Journal of Physical Chemistry B, 107(16), 3712-3718.

Zhang, X., Chen, Y., Konsowa, A. H., Zhu, X., and Crittenden, J. C. (2009a). Evaluation of an innovative polyvinyl chloride (PVC) ultrafiltration membrane for wastewater treatment. Separation and Purification Technology, 70 (1), 71-78.

Zhang, M. G., Nguyen, Q. T., and Ping, Z. (2009b). Hydrophilic modification of poly (vinylidene fluoride) microporous membranes. Journal of Membrane Science, 327 (1-2), 78-86.

Zhou, M., Liu, H., Kilduff, J. E., Langer, R., Anderson, D. G., and Belfort, G. (2009). High-throughput membrane surface modification to control NOM fouling. Environmental Science and Technology, 43, 3865-3871.

Zhu, L. P., Dong, H. B., Yi, Z., and Zhu, B. K. (2009). Amphiphilic PPESK-graft-P(PEGMA) copolymer for surface modification of PPESK membranes. Materials Chemistry and Physics, 115(1), 223-228.

Zhu, Y., Murali, S., Cai, W., Li, X., Suk, J., Potts, J. R., and Ruoff, R. S. (2011). Graphene and graphene oxide: synthesis, properties and applications. Advanced Materials, 22 (35), 3906-3924.

What is claimed is:

1. A water permeable membrane comprising:
a porous support; and
a composite layer disposed over the porous support, the composite layer including graphene oxide dispersed within a polymer matrix, wherein the polymer matrix is a cross-linked poly(styrene sulfonic acid-(PSSA)-co styrene-co-methyl styrene) copolymer-polyvinylidene fluoride (PVDF) blend.

2. The water permeable membrane of claim 1 wherein the graphene oxide has a dimension of from 10 nm to about 500 nm.

3. The water permeable membrane of claim 1 wherein the graphene oxide is present in an amount from about 0.05 weight percent to about 20 weight percent of the total combined weight of the graphene oxide and polymer matrix.

4. The water permeable membrane of claim 1 wherein the composite layer has a thickness greater than about 10 nm.

5. The water permeable membrane of claim 1 wherein the porous support includes a porous polymer.

6. The water permeable membrane of claim 5 wherein the porous polymer includes polysulfone.

7. The water permeable membrane of claim 5 wherein the porous support includes a fabric layer, the porous polymer being disposed over the fabric layer.

8. The water permeable membrane of claim 1 wherein the graphene oxide increases the hydrophilic nature of the water permeable membrane, increases aqueous transport and permeate fluxes, reduces fouling potential of the water permeable membrane during operation, and promotes free radical reactions aiding destruction of trace organic and inorganic contaminants.

9. The water permeable membrane of claim 1 applied in water reclamation, wastewater treatment, and water purification.

10. The water permeable membrane of claim 1 formed by a method in which polymer film properties are adjusted by controlling polymerization reaction conditions, polymerization reaction conditions including monomers and solvents proportions, reaction time, reaction temperature, and annealing temperature.

11. The water permeable membrane of claim 10 wherein polymer film properties include film thickness and pore-size.

12. The water permeable membrane of claim 1 wherein the graphene oxide is mixed and dispersed by ultrasonication.

13. The water permeable membrane of claim 1 further comprising a cleaned surface formed by cleaning the water permeable membrane by a surfactant or an enzyme cleaning agent.

14. The water permeable membrane of claim 13 wherein the water permeable membrane exhibits chemical stability and material durability during cleaning operations and wherein flux recoveries are realized after these cleaning operations with no graphene oxide particles leaching out of the water permeable membrane.

15. The water permeable membrane of claim 1 further comprising a coating of powder activated carbon.

16. The water permeable membrane of claim 15 wherein the powder activated carbon minimize membrane fouling by forming the coating on a water permeable membrane surface and effecting a cleansing action by adsorption of foulants including natural organic matter and biological organic matter, powder activated carbon reducing fouling, enhancing permeate flux, and reducing frequency of backwashing and chemical cleaning thereby enhancing membrane durability and longevity.

17. The water permeable membrane of claim 15 wherein the powder activated carbon removes organic contaminants in water reclamation, wastewater treatment, and water purification, the organic contaminants including solvents, pesticides, pharmaceutical and personal care products (PCPPs) and other endocrine disrupting chemicals (EDCs).

18. The water permeable membrane of claim 1 wherein the graphene oxide at a membrane surface includes functionalized carboxylic acid groups.

19. The water permeable membrane of claim 1 wherein a membrane surface is functionalized with carbodiimide.

20. The water permeable membrane of claim 1 wherein the graphene oxide at a membrane surface includes carboxylic acid groups functionalized into amides having a tertiary amine.

21. A water purification system comprising:
a chamber having a first water holding section for holding impure water and a second water holding section for holding purified water;
a water permeable membrane interposed between the first water holding section and the second water holding section, the water permeable membrane including a porous support and a composite layer disposed over the porous support, the composite layer including graphene oxide dispersed within a polymer matrix wherein the polymer matrix is a cross-linked poly(styrene sulfonic acid-(PSSA)-co styrene-co-methyl styrene) copolymer-polyvinylidene fluoride (PVDF) blend; and
a pressure applicator that applies pressure to impure water in the first water holding section such that water permeates through the water permeable membrane into the second water holding section.

22. The water purification system of claim 21 wherein the pressure applicator maintains water in the first water holding section at a pressure from 20 to 1500 psi.

23. The water purification system of claim 21 wherein the graphene oxide has a dimension of from 10 nn to about 500 nm.

24. The water purification system of claim 21 wherein the graphene oxide is present in an amount from about 0.05 weight percent to about 20 weight percent of the total combined weight of the graphene oxide and polymer matrix.

25. The water purification system of claim 21 wherein the composite layer has a thickness greater than about 10 nm.

26. The water purification system of claim 21 wherein the porous support includes a porous polymer.

27. The water permeable membrane of claim 26 wherein the porous polymer includes polysulfone.

28. The water permeable membrane of claim 26 wherein the porous support includes a fabric layer, the porous polymer being disposed over the fabric layer.

29. An ultrafiltration process applying the water permeable membrane of claim 1 for pretreatment of wastewaters prior to nanofiltration and reverse osmosis to protect the nanofiltration or reverse osmosis membranes from different types of foulants including particulate, organic, inorganic and biological matter.

30. The ultrafiltration process of claim 29 applied to wastewater treatment and water reclamation and reuse.

* * * * *